(12) United States Patent
Harvey et al.

(10) Patent No.: US 8,548,834 B2
(45) Date of Patent: Oct. 1, 2013

(54) INFORMATION CAPTURE, PROCESSING AND RETRIEVAL SYSTEM AND METHOD OF OPERATING THE SAME

(75) Inventors: Tony S. Harvey, West Lafayette, IN (US); John C. O'Neill, Dallas, TX (US)

(73) Assignee: Xtraprise, L.P., Dallas, TX (US)

( * ) Notice: Subject to any disclaimer, the term of this patent is extended or adjusted under 35 U.S.C. 154(b) by 1514 days.

(21) Appl. No.: 11/592,646

(22) Filed: Nov. 3, 2006

(65) Prior Publication Data

US 2007/0106567 A1 May 10, 2007

Related U.S. Application Data

(60) Provisional application No. 60/733,368, filed on Nov. 4, 2005.

(51) Int. Cl.
*G06Q 40/00* (2012.01)

(52) U.S. Cl.
USPC .......................................... 705/7.11; 705/7.42

(58) Field of Classification Search
USPC ................ 705/1, 7, 9, 11, 7.11–7.42; 726/26
See application file for complete search history.

(56) References Cited

U.S. PATENT DOCUMENTS

| | | | |
|---|---|---|---|
| 5,970,475 A | 10/1999 | Barnes et al. | |
| 6,249,715 B1 | 6/2001 | Yuri et al. | |
| 6,408,337 B1 | 6/2002 | Dietz et al. | |
| 6,751,650 B1 * | 6/2004 | Finch et al. | 709/203 |
| 2002/0010614 A1 * | 1/2002 | Arrowood | 705/9 |
| 2002/0103687 A1 * | 8/2002 | Kipling | 705/8 |
| 2004/0039681 A1 * | 2/2004 | Cullen et al. | 705/37 |
| 2004/0059583 A1 * | 3/2004 | O'Neill | 705/1 |
| 2004/0260601 A1 * | 12/2004 | Brief | 705/11 |

* cited by examiner

*Primary Examiner* — Thomas Dixon
*Assistant Examiner* — Benjamin S Fields
(74) *Attorney, Agent, or Firm* — Boisbrun Hofman, PLLC

(57) ABSTRACT

An information capture, processing and retrieval ("ICPR") system shared by multiple buyers, suppliers and workers concurrently and a method of operating the same. In one embodiment, the ICPR system includes an order documentation subsystem configured to document orders for the suppliers and the buyers with respect to the workers. Each of the orders specifies a different method of time capture for the workers assigned thereto. The ICPR system also includes a time capture subsystem configured to receive the different methods of time capture from the workers positioned in one of anchored and untethered locations assigned to the orders. In a related embodiment, the ICPR system further includes a time approval and buyer tagging subsystem configured to allow the buyers to label time worked by the workers corresponding to the buyers with one or more tags, thereby translating approved time of the workers into custom, internal terminology of the buyers.

45 Claims, 61 Drawing Sheets

Creating New Order

| Step 1<br>Select Selling Location | Step 2<br>Select Customer | Step 3<br>Setup Start Info | Step 4<br>Select Job Title | Step 5<br>Setup Order | Step 6<br>▶ *Finish* |

← Previous Step

Order Info | This information is shared

| | |
|---|---|
| Contractors: | Walter Gillette |
| People Supplier: | National Staffing |
| People Supplier Primary Contact: | mbaker@nationalstaffing.com |
| People Supplier Alternate Contact: | |
| Workplace Company: | Acme Buying Company |
| Workplace Buyer Primary Contact: | canderson@acme.com |
| Planned Work Start Date: | 6/6/2005 |
| Estimated Work End Date: | 6/30/2006 |
| Estimated Hours/Week: | 40 |
| Bill Rate: | $75.00/hr |
| Weekly OverTime Factor: | 1.5 > 40hrs |
| Add Ons: | None |
| Customer PO/Req#: | 870001 |
| Sales Tax Rate Applied: | Tax Exempt 0% |
| People Supplier Sales Order #: | ACME1290 |
| Order Notes: | |

Additional Info | This information is NOT shared with your customer

| | |
|---|---|
| Pay Rate: | $50.00/hr |
| Additional Billing Items: | None |
| Burden % Applied: | 20% |
| Gross Margin % - After Applied Burden: | 20.00% |

FIG. 10

Subject: Work order for you

Sent: Tue 5/23/2006 1:51 PM

| Order Info | |
|---|---|
| Order Status: | Being Built |
| Contractors: | Joseph Carlson |
| People Supplier: | Supplier A |
| People Supplier Primary Contact: | lparker@SupplierA.com |
| People Supplier Alternate Contact: | |
| Workplace Company: | Workplace Buyer 1: Phoenix DC |
| Workplace Buyer Primary Contact: | hgill@workplacebuyer1.com |
| Planned Work Start Date: | 10/31/2005 |
| Estimated Work End Date: | 12/31/2005 |
| Estimated Hours/Week: | 40 |
| Time Card Submits by: | |
| Default Shift: | 1 |
| Week Ends On: | Sun |
| Bill Rate: | $14.00/hr |
| Weekly OverTime Factor: | 1.5 > 40hrs |
| Shifts: | Not using shifts |
| Add Ons: | None |
| Customer PO/Req#: | |
| Sales Tax Rate Applied: | Tax Exempt 0% |
| People Supplier Sales Order # | |
| Order Notes: | |

FIG. 11

Contractor Timecard

Shelly Chang

Go To | Timecard | Setup | Help | Help

Work Dates: 10/3/2005 - 12/31/2005
Work Location: Workplace Buyer 1: Corporate HQ Click the double arrow to the left of the work week for which you want to enter time

| September | October 2005 | | | | | November | |
|---|---|---|---|---|---|---|---|
| Mo | Tu | We | Th | Fr | Sa | Su | |
| 26 | 27 | 28 | 29 | 30 | 1 | 2 | |
| ⇉ 3 | 4 | 5 | 6 | 7 | 8 | 9 | |
| ⇉ 10 | 11 | 12 | 13 | 14 | 15 | 16 | |
| ⇉ 17 | 18 | 19 | 20 | 21 | 22 | 23 | |
| ⇉ 24 | 25 | 26 | 27 | 28 | 29 | 30 | |
| ⇉ 31 | 1 | 2 | 3 | 4 | 5 | 6 | |

Color Key:
- Submitted Time
- Approved Time
- Entered Time

☐ I certify that the above hours are accurate

Email to Approve [        ]

[ Submit for Approval ]  [ Cancel ]

Hours for the week of: 10/3/5 - 10/9/5

| Work Day | Hours | Notes | |
|---|---|---|---|
| Mon-3 | 8 | | ◁ ▷ |
| Tue-4 | 8.5 | | ◁ ▷ |
| Wed-5 | 8.25 | | ◁ ▷ |
| Thu-6 | 7 | | ◁ ▷ |
| Fri-7 | 8 | Worked Fri in Finance dept; remainder in HR | ◀ ▶ |
| Sat-8 | 2 | | ◁ ▷ |
| Sun-9 | 0 | | ◁ ▷ |
| Total Hrs: | 41.75 | | |

FIG. 12

Batch Timecard Entry

Vendor: Supplier A
Week Ends on: Sunday
Timecard Week: 10/3/2005 - 10/9/2005

Select Orders for timecards.

| | | Contractor | Shift | Vendor User Name | Order Start | Order End | Buyer Email | Buyer Name | Status |
|---|---|---|---|---|---|---|---|---|---|
| ☑ | Info | Bennett, Carl | 1 | Parker, Lisa | 8/1/2005 | 8/1/2006 | hgill@workplacebuyer1.com | Gill, Henry | Approved |
| | Info | Hernandez, Warren | 1 | Parker, Lisa | 10/3/2005 | 12/31/2006 | hgill@workplacebuyer1.com | Gill, Henry | |
| ☑ | Info | Mueller, Vicente | 1 | Parker, Lisa | 10/3/2005 | 12/31/2006 | hgill@workplacebuyer1.com | Gill, Henry | |
| ☑ | Info | Sanchez, Tina | 1 | Parker, Lisa | 8/1/2005 | 8/1/2006 | hgill@workplacebuyer1.com | Gill, Henry | Approved |
| | Info | Spector, Randall | 1 | Parker, Lisa | 8/1/2005 | 8/1/2006 | hgill@workplacebuyer1.com | Gill, Henry | Approved |
| ☑ | Info | Walker, Jenny | 1 | Parker, Lisa | 10/3/2005 | 12/31/2006 | hgill@workplacebuyer1.com | Gill, Henry | |

[Submit] [Cancel]

FIG. 13

Batch Timecard Entry

Henry Gill
WorkplaceBuyer1

Logout | My Account | Orders | Timecards | Invoices | Reports

Help

Vendor: Supplier A
Week Ends on: Sunday
Timecard Week: 10/3/2005 - 10/9/2005

Hours

Day for entry: Monday ▼
Hours: ☐
Overwrite Existing Hours: ☐

[Apply Hours]

Comments

Comment: ◄ ►
Overwrite Existing Comments: ☐

[Apply Comments]

| | Terminate | Contractor Name | Mon | Tue | Wed | Thu | Fri | Sat | Sun | Shifts | Total | Comments |
|---|---|---|---|---|---|---|---|---|---|---|---|---|
| Info ▼ | No ▼ | Hernandez, Warren | 8.5 | 8 | 9.25 | 8 | 8 | | | | 41.75 | ◄ ► |
| Info ▼ | No ▼ | Mueller, Vicente | 8 | 8 | 8 | 8 | 8 | | | | 40.00 | ◄ ► |
| Info ▼ | No ▼ | Walker, Jenny | | | 8.75 | 8 | 7.5 | | | | 24.25 | ◄ ► |

[Save All Hours]  [Save All Hours - Submit Selected Orders]  [Cancel]

FIG. 14

Batch Timecards

Vendor: Cruise Software, Inc
Week Ends on: Sunday
Timecard Week: 10/10/2005 - 10/16/2005

| | Terminate | Contractor Name | Mon | Tue | Wed | Thu | Fri | Sat | Sun | Total | Comments |
|---|---|---|---|---|---|---|---|---|---|---|---|
| Info Edit ☑ | No ▼ | Smith, Jennifer | 6.5 | 3 | 3 | | | | 3.75 | 16.25 | |
| Info Edit ☑ | No ▼ | TimeClock, Joe *Hours* | | | | | | | | | |
| | | *Boxes* | | | | | | | | | |
| | | *Crates* | | 3 | | | | | | .00 | |

[Save All Hours] [Save All Hours - Submit Selected Orders] [Cancel]

Logout  My Account  Orders  Timecards  Invoices  Reports  Help  Administration

Buyer Prime
AACo

FIG. 16

Buyer Prime
AACo

Logout   My Account   Orders   Timecards   Invoices   Reports   Help   Administration Edit Time Clock Contractor Name: Smith, Jennifer
Work Week:   10/10/2005 - 10/16/2005

Add Entry

| WorkDate | | StartTime | EndTime | Line Time | Day Time | Week Time | | |
|---|---|---|---|---|---|---|---|---|
| Mon | 10/10/05 | 11:00 AM | 5:30 PM | 6:30 | 6:30 | 6:30 | Edit | Delete |
| Tue | 10/11/05 | 8:00 AM | 11:30 AM | 3:30 | | 10:00 | Edit | Delete |
| | | 1:00 PM | 5:00 PM | 4:00 | 7:30 | 14:00 | Edit | Delete |
| Wed | 10/12/05 | 8:00 AM | 11:00 AM | 3:00 | | 17:00 | Edit | Delete |
| | | 12:00 PM | 5:00 PM | 5:00 | 8:00 | 22:00 | Edit | Delete |
| Thu | 10/13/05 | 8:00 AM | 12:00 PM | 4:00 | | 26:00 | Edit | Delete |
| | | 1:00 PM | 5:13 PM | 4:13 | 8:13 | 30:13 | Edit | Delete |
| Fri | 10/14/05 | 8:00 AM | 12:00 PM | 4:00 | | 34:13 | Edit | Delete |
| | | 1:00 PM | 5:00 PM | 4:00 | 8:00 | 38:13 | Edit | Delete |
| Total: | | | | | | 38:13 | | |

Update Timecard     Cancel

FIG. 17

| | | | | | | Buyer Prime |
| --- | --- | --- | --- | --- | --- | --- |
| | | | | | | AACo |
| Logout | My Account | Orders | Timecards | Invoices | Reports | Help | Administration |

Edit Time Clock

Contractor Name: Smith, Jennifer
Work Week: 10/10/2005 - 10/16/2005

Add Entry

| WorkDate | | StartTime | EndTime | Line Time | Day Time | Week Time | | |
| --- | --- | --- | --- | --- | --- | --- | --- | --- |
| Mon | 10/10/05 | 11:00 AM | 5:30 PM | 6:30 | 6:30 | 6:30 | Edit | Delete |
| Tue | 10/11/05 | 8:00 AM | 11:30 AM | 3:30 | 7:30 | 10:00 | Edit | Delete |
| | | 1:00 PM | 5:00 PM | 4:00 | | 14:00 | Edit | Delete |
| Wed | 10/12/05 | 8 ▼ : 00 ▼ AM ▼ | 11 ▼ : 00 ▼ AM ▼ | 3:00 | 8:00 | 17:00 | Update | Cancel |
| | | 12:00 PM | 5:00 PM | 5:00 | | 22:00 | Edit | Delete |
| Thu | 10/13/05 | 8:00 AM | 12:00 PM | 4:00 | 8:13 | 26:00 | Edit | Delete |
| | | 1:00 PM | 5:13 PM | 4:13 | | 30:13 | Edit | Delete |
| Fri | 10/14/05 | 8:00 AM | 12:00 PM | 4:00 | 8:00 | 34:13 | Edit | Delete |
| | | 1:00 PM | 5:00 PM | 4:00 | | 38:13 | Edit | Delete |
| Total: | | | | | | 38:13 | | |

[Update Timecard]  [Cancel]

FIG. 18

Edit Time Clock

Contractor Name: Smith, Jennifer
Work Week: 10/10/2005 - 10/16/2005

☒ Add Entry

Work Date: Monday, October 10, 2005 ▼
Hours: 8 ▼ : 00 ▼ AM ▼ to 11 ▼ : 00 ▼ AM ▼
[Add] [Cancel]

| WorkDate | | StartTime | EndTime | Line Time | Day Time | Week Time | | |
|---|---|---|---|---|---|---|---|---|
| Mon | 10/10/05 | 11:00 AM | 5:30 PM | 6:30 | 6:30 | 6:30 | Edit | Delete |
| Tue | 10/11/05 | 8:00 AM | 11:30 AM | 3:30 | | 10:00 | Edit | Delete |
| | | 1:00 PM | 5:00 PM | 4:00 | 7:30 | 14:00 | Edit | Delete |
| Wed | 10/12/05 | 8:00 AM | 11:00 AM | 3:00 | | 17:00 | Edit | Delete |
| | | 12:00 PM | 5:00 PM | 5:00 | 8:00 | 22:00 | Edit | Delete |
| Thu | 10/13/05 | 8:00 AM | 12:00 PM | 4:00 | | 26:00 | Edit | Delete |
| | | 1:00 PM | 5:13 PM | 4:13 | 8:13 | 30:13 | Edit | Delete |
| Fri | 10/14/05 | 8:00 AM | 12:00 PM | 4:00 | | 34:13 | Edit | Delete |
| | | 1:00 PM | 5:00 PM | 4:00 | 8:00 | 38:13 | Edit | Delete |
| Total: | | | | | | 38:13 | | |

[Update Timecard] [Cancel]

Logout  My Account  Orders  Timecards  Invoices  Reports  Help  Administration

Buyer Prime
AACo

FIG. 19

Punch IN :

Dorn, Tom

Select Time Clock: Call Center ▼

Thursday, October 26, 2006 ▼  8 ▼  00 ▼  AM ▼

Submit   Cancel

...OR...

Select Work Week for editing

| September | October 2006 | | | | | November | |
|---|---|---|---|---|---|---|---|
| Mo | Tu | We | Th | Fr | Sa | Su | |
| ⏭ 25 | 26 | 27 | 28 | 29 | 30 | 1 | |
| ⏭ 2 | 3 | 4 | 5 | 6 | 7 | 8 | |
| ⏭ 9 | 10 | 11 | 12 | 13 | 14 | 15 | |
| ⏭ 16 | 17 | 18 | 19 | 20 | 21 | 22 | |
| ⏭ 23 | 24 | 25 | 26 | 27 | 28 | 29 | |
| ⏭ 30 | 31 | 1 | 2 | 3 | 4 | 5 | |

Seller Batch Timecards

Clark, Stephanie
Lawson Staffing

Logout  My Account  Orders  Timecards  Invoices  Reports  Administration   Help

Customer: Prograde Supply
Week Ends on: Saturday
Timecard Week: 10/8/2006 - 10/14/2006 choose the workers for whom you want to submit time for the Timecard week selected. To choose workers, click the check box to the left of the worker name, then click "Submit"

| ☑ | Status | Contractor | Vendor User Name | Order Start | Order End | Seller Email  All ▼ | Buyer Name | WBEmail |
|---|---|---|---|---|---|---|---|---|
| ☑ | Info | Romack, Henry | Clark, Stephanie | 10/9/2006 | 12/1/2006 | sclark@lawson.com | oneill, jc | jco@progradesupply.com |
| ☑ | Info | Wesley, Fran | Clark, Stephanie | 10/9/2006 | 12/1/2006 | sclark@lawson.com | oneill, jc | jco@progradesupply.com |

Submit  Cancel

Seller Batch Timecards

Customer: Prograde Supply
Week Ends on: Saturday
Timecard Week: 10/8/2006 - 10/14/2006

Logout | My Account | Orders | Timecards | Invoices | Reports | Administration | Help

Hours

Day for entry: Sunday
Hours: ☐
Overwrite Existing Hours: ☐
[Apply Hours]

Comments

Comment: 
Overwrite Existing Comments: ☐
[Apply Comments]

| | Contractor Name | Sun | Mon | Tue | Wed | Thu | Fri | Sat | Total | Comments |
|---|---|---|---|---|---|---|---|---|---|---|
| ☑ Info | Romack, Henry | | 8.5 | 9 | 11 | 7 | 7 | | 42.50 | |
| ☑ Info | Wesley, Fran | | 8 | 8 | 8 | 8 | 8 | | 40.00 | |

[Save All Hours] [Save All Hours - Submit Selected Orders] [Cancel]

☑ I certify that the above hours are accurate.
Email to Approve: jco@progradesupply.com

[Submit for Approval] [Cancel]

FIG. 25

Timecard Approval

Please review this timecard and submit.

Contractor: Shelly Chang - schang@hotmail.com
Work Dates: 10/3/2005 - 10/9/2005
Buyer: hgill@workplacebuyer1.com

| WorkDate | Times | Hours | Notes |
|---|---|---|---|
| Mon 10/03/05 | - | 8.00 | |
| Tue 10/04/05 | - | 8.50 | |
| Wed 10/05/05 | - | 8.25 | |
| Thu 10/06/05 | - | 7.00 | |
| Fri 10/07/05 | - | 8.00 | Worked Fri in Finance dept; remainder in HR |
| Sat 10/08/05 | - | 2.00 | |
| Sun 10/09/05 | - | 0.00 | |
| | Totals: | 41.75 | |

O Approve
O Reject    Reason:

Submit

FIG. 27

| | | | Logout | My Account | Orders | Timecards | Invoices | Reports | | | | Henry Gill WorkplaceBuyer1 |
|---|---|---|---|---|---|---|---|---|---|---|---|---|
| | | | | | | Approve Waiting Timecards | | | | | | |
| | | | | | | View Submitted and Approved Timecards | | | | | | |
| | | | | | | Batch Submit Timecards | | | | | | |
| ☑ | | SellingCompanyName | Contractor | StartDate | EndDate | SubmitDate | Billable Hours | Hours Bill Amount | Add On Billable | Tax | Total Bill Amount |
| ☑ | Info | Supplier A | Wesley, Keith | 7/24/2006 | 7/30/2006 | 6/13/2006 | 44.5 | $3,337.50 | $0.00 | $0.00 | $3,337.50 |
| ☑ | Info | Supplier A | Brewer, Tagg | 7/24/2006 | 7/30/2006 | 6/13/2006 | 41 | $3,075.00 | $0.00 | $0.00 | $3,075.00 |
| ☑ | Info | Supplier A | Peters, Joyce | 7/24/2006 | 7/30/2006 | 6/13/2006 | 37.5 | $2,812.50 | $0.00 | $0.00 | $2,812.50 |
| ☑ | Info | Supplier A | McMillen, Charles | 7/24/2006 | 7/30/2006 | 6/13/2006 | 44 | $1,759.50 | $0.00 | $0.00 | $1,759.50 |

Approve Selected Timecards

Reject Selected Timecards

| | |
|---|---|
| Hours Worked: | 41.75 |
| Hours Applied: | 41.75 |
| Hours Remaining: | 0.00 |
| Hours to Apply: | 33.75 |

[Apply]

[Timecard Details]
[Clear Tags]
[Cancel Tagging]

Order Info

Contractor: Shelly Chang
Work Dates: 10/3/2005 - 10/9/2005

Instructions:
1. You may label the entire total of "Hours Worked". Or, you may label that time into multiple parts.
2. Insert the portion of time you want to label in "Hours to Apply".
3. Using the Wizard Table, complete the label of that portion of time by selecting the tags preconfigured by your company. The workers comments in the approval timecard may help you apply the proper tags.
4. Repeat steps 2 and 3 until "Hours Remaining" equals 0.00.

Tagging Groups:
1. Location
2. Department
3. Expense Code
4. Project
5. Job Activity
6. Shift

| 8 | Phoenix Office | Phoenix Office |
|---|---|---|
| | Finance | |
| | 6620 Office Support | |
| | N/A | |
| | Clerical | |
| | N/A | |
| 33.75 | | |

Department | Now on tag group 2 of 6

- 📁 Department
  - 📁 Manufacturing
  - 📁 Service
  - 📁 Administration
    - 📁 HR
    - 📁 Finance
    - 📁 IT

[Cancel]

FIG. 30

| Logout | My Account | Orders | Timecards | Invoices | Reports | Help |

Jason Bolton
Acme Buying Company

Info

Number of orders in this group: 8

% Applied: 0.00
% Remaining: 100.00
% to Apply: 75

[Apply]

Tagging timecards is a way to track how hours should be allocated. "Tags" are categories that your company has defined as being important to you for reporting. Your company's tagging groups are identified below.

To tag timecards:
1. Allocate a percentage of hours for which you want to create a set of tags and click "Apply". Tagging is based on percent, not hours, because often you will be tagging hours for multiple workers.
2. Select your tags.
3. Repeat steps 1 and 2 until you have allocated 100% of hours.
4. Finalize and approve the timecard(s).

[Clear Tags]
[Cancel Tagging]

Tagging Groups:
1. Locations
2. Accounting Codes
3. Projects
4. Job Titles

FIG. 31

| | Logout | My Account | Orders | Timecards | Invoices | Reports | Help | Jason Bolton |
|---|---|---|---|---|---|---|---|---|
| | | | | | | | | Acme Buying Company |

Info

Number of orders in this group: 8

% Applied: 100.00
% Remaining: 0.00
% to Apply: 0    [Apply]

Tagging timecards is a way to track how hours should be allocated. "Tags" are categories that your company has defined as being important to you for reporting. Your company's tagging groups are identified below.

[Clear Tags]

[Cancel Tagging]

To tag timecards:
1. Allocate a percentage of hours for which you want to create a set of tags and click "Apply". Tagging is based on percent, not hours, because often you will be tagging hours for multiple workers.
2. Select your tags.
3. Repeat steps 1 and 2 until you have allocated 100% of hours.
4. Finalize and approve the timecard(s).

| Tagging Groups: | | | | | |
|---|---|---|---|---|---|
| | 75 | Edit<br>Del | 25 | Edit<br>Del | |
| 1. Locations | Florida Plant Production | | Florida Plant Production | | |
| 2. Accounting Codes | Distribution Logistics Phase 1 | | Distribution Logistics Phase 2 | | |
| 3. Projects | Assembler | | Assembler | | |
| 4. Job Titles | | | | | |

[Create approved timecard submits for 8 orders.]

FIG. 32

| | | | | | | | Steven Wheeler |
|---|---|---|---|---|---|---|---|
| | | | | | | | Regent Staffing |
| Logout | My Account | Orders | Timecards | Invoices | Reports | Help | Administration |

Customer Invoicing  Help

Use this screen to invoice customers. To begin, please select a customer from the list below.

If you would like to group ("batch") invoices together for later, click the "Batch Invoices for Later Emailing" check box.

☐ Batch Invoices for Later E-Mailing.

| Customers with Invoices | |
|---|---|
| Acme Buying Company | Select |
| Prograde Supply | Select |
| Red Rooster, Inc. | Select |
| Sun Systems, Inc. | Select |

FIG. 33

Steven Wheeler
Regent Staffing

| Logout | My Account | Orders | Timecards | Invoices | Reports | Help | Administration |

Help

Customer Invoicing

Acme Buying Company Cust Info
Click to work with another customer

Invoice Number: 87200
Invoice Date: 6/10/2005

Selected Total: 2531.75

To create an invoice, choose the appropriate orders/workers from the list below by clicking the check boxes.
Enter an invoice number and invoice date, then click "Create Invoice". The invoice number/date will be shared with your customer.

Create Invoice

| | Target Buyer EMail | Worker Name | Shift | StartDate | EndDate | Submitted | Approved | Selling Location ☐ | Billable Hours | Hours Bill Amount | Add Ons | Sales Tax | Total | Outside Customer Name |
|---|---|---|---|---|---|---|---|---|---|---|---|---|---|---|
| ☑ | Info jbolton@acme.com | Arrington, Jonathan | 1 | 6/20/2005 | 6/26/2005 | 6/10/2005 | 6/10/2005 | Florida | 30.5 | $289.75 | $0.00 | $0.00 | $289.75 | Acme Buying Company |
| ☑ | Info jbolton@acme.com | Baker, Carla | 1 | 6/20/2005 | 6/26/2005 | 6/10/2005 | 6/10/2005 | Florida | 38 | $361.00 | $0.00 | $0.00 | $361.00 | Acme Buying Company |
| ☑ | Info jbolton@acme.com | Cardero, Jose | 1 | 6/20/2005 | 6/26/2005 | 6/10/2005 | 6/10/2005 | Florida | 32 | $304.00 | $0.00 | $0.00 | $304.00 | Acme Buying Company |
| ☑ | Info jbolton@acme.com | Chang, Annabollo | 1 | 6/20/2005 | 6/26/2005 | 6/10/2005 | 6/10/2005 | Florida | 37 | $351.50 | $0.00 | $0.00 | $351.50 | Acme Buying |

FIG. 34

Logout   My Account   Orders   Timecards   Invoices   Reports   Administration

Stephanie Clark
Lawson Staffing

Timecard End Date Range: Start Date 10/09/2006   End Date 10/15/2006

Location: Select Selling Locations   All items currently selected.

Only NOT Exported: ☑

Include Unapproved: ☐

Export Type: ExpressQ3 ▶
- ExpressQ3
- PayChex
- ADP
- SecurePay
- Generic
- QuickBooks
- PeopleSoft

| | | | | | Logout | My Account | Orders | Timecards | Invoices | Reports | Administration |

Stephanie Clark
Lawson Staffing

Export Info  From 10/09/2006 to 10/15/2006
Exporting to the PayChex format.
Only Approved Timecards

[ Change Setup ]

[ Export Marked Items ]

| ☑ | Status | Week Start | Week End | ContractorName | Hours | Pay Ra |
|---|---|---|---|---|---|---|
| ☑ Info | Approved | 10/8/2006 | 10/14/2006 | Romack, Henry | 42.50 | 8.2500 |
| ☑ Info | Approved | 10/8/2006 | 10/14/2006 | Wesley, Fran | 40.00 | 8.2500 |

Timecard Info -- Web Page Dialog

Timecard Submission Information

| WorkDate | Times | Hours | Notes |
|---|---|---|---|
| Mon 10/09/06 | - | 8.50 | |
| Tue 10/10/06 | - | 9.00 | |
| Wed 10/11/06 | - | 11.00 | |
| Thu 10/12/06 | - | 7.00 | |
| Fri 10/13/06 | - | 7.00 | |

Totals: 42.50
Billable
Non Billable 0.00

Selling Vendor : Lawson Staffing
Contractor Name : Romack, Henry
Submit Date : 10/10/06
Approved Date : 10/10/06
Approval Email : jco@progradesupply.com
Invoice Number :
Invoice Date :
Voucher Number :
Voucher Date :
Check Number :
Check Date :

FIG. 37

Exit Survey v3.0

Page 2 of 2

Exit Survey

| | | 1 | 2 | 3 | 4 | 5 |
|---|---|---|---|---|---|---|
| 3. | Assessment of Worker*<br>Scale of 1 to 5 with 1 being 'poor' and 5 being 'excellent' | | | | | |
| | The attitude of the worker: | O | O | ◉ | O | O |
| | The work attendance and on-time behavior of the worker: | O | O | O | ◉ | O |
| | The quality of work performance by this worker: | O | O | O | ◉ | O |
| | The worker stayed on the assignment for the agreed-upon time (turnover rating): | ◉ | O | O | O | O |
| 4. | I would request this worker for a future assignment.*<br>O Yes<br>◉ No | | | | | |
| 5. | Assessment of Supplier*<br>Scale of 1 to 5 with 1 being 'poor' and 5 being 'excellent' | 1 | 2 | 3 | 4 | 5 |
| | The supplier's matching of the skill | | | | | |

FIG. 39

| | | | Logout | My Account | Orders | Timecards | Invoices | Reports | Forrest Watkins WorkplaceBuyer1 |

Show View review fill survey results

| | | | | View Options |
| --- | --- | --- | --- | --- |
| | | | Change | Show |
| | | | List | Save |

3 items in this list.
Export

| ▲ | Survey Date | Contract Worker | Primary Buyer Contact (email) | People Supplier | Supplier's Fill Response Quality | Supplier's Fill Response Timeliness | Supplier's Orientation of the Worker | Supplier's Average Fill Rating |
|---|---|---|---|---|---|---|---|---|
| Info | 10/26/2006 | Dennison, Frank | cdavis@workplacebuyer1.com | Supplier A | 4.00 | 4.00 | 3.00 | 3.70 |
| Info | 10/26/2006 | Estrella, Peggy | swinters@workplacebuyer1.com | Supplier A | 2.00 | 2.00 | 1.00 | 1.70 |
| Info | 10/26/2006 | Carlson, Joseph | hgill@workplacebuyer1.com | Supplier A | 3.00 | 4.00 | 3.00 | 3.30 |

FIG. 40

Forrest Watkins
WorkplaceBuyer1

Logout    My Account    Orders    Timecards    Invoices    Reports

Show View review exit survey results

View Options
| Change | Show |
|--------|------|
| List   | Save |

4 items in this list.
Export

| | Date Survey Taken | Contract Worker | People Supplier | Reason Ended | Worker Attitude | Attendance and On-time Rating | Work Quality | Turnover Rating | Skill Level Match by Supplier | Supplier Communication | Overall Supplier Exit Rating |
|---|---|---|---|---|---|---|---|---|---|---|---|
| ▲ | | | | | | | | | | | |
| Info | 10/26/2006 | Dennison, Frank | Supplier A | Accepted full-time employment elsewhere | 3 | 4 | 4 | 1 | 3 | 3 | 3 |
| Info | 10/26/2006 | Estrella, Peggy | Supplier A | Unacceptable fit due to skills required | 2 | 1 | 1 | 1 | 2 | 2 | 2 |
| Info | 10/26/2006 | Bennett, Carl | Supplier A | Acceptable fit and we hired the worker directly | 5 | 5 | 5 | 5 | 5 | 5 | 5 |
| Info | 10/26/2006 | Carlson, Joseph | Supplier A | Had unacceptable screening results (e.g., drug test, background check) | 4 | 3 | 3 | 1 | 3 | 4 | 3 |

FIG. 41

| Logout | My Account | Orders | Timecards | Invoices | Reports | Help | Administration |

View

Orders
*Current Orders*

Main Selectors

Order Status
[All ▼]

My Selling Locations
☑ Georgia
☐ San Diego
⊞ ☐ Northwest Region
⊞ ☐ Midwest Region This Vendor Only

Field Selectors:
All from: *ContractorName*
All from: *SellingUserName*
Where: *EstimatedHours* [Between] [▼ 35] and [45]
All from: *PayRate*
All from: *BillRate*
All from: *Burden*

[Generate View] [Cancel]

FIG. 42

| | | Logout | My Account | Orders | Timecards | Invoices | Reports | Help | Administration |
|---|---|---|---|---|---|---|---|---|---|

Show View

Orders
*Current Orders*

Change View Setup
Back to List

*75 items in this list.*
Export

| | BuyingCompany | ContractorName | SellingUserName | DateCreated | EstimatedHours | LocationName | OrderStatus | SellerCu |
|---|---|---|---|---|---|---|---|---|
| Info | AACo | asdf, asdf | Smith, Jennifer | 2/24/2005 | 40 | Georgia | Active | Diesel Pow |
| Info | AACo | Hill, Dean | Smith, Jennifer | 2/24/2005 | 40 | Georgia | Active | Diesel Pow |
| Info | AACo | Flora, John | Smith, Jennifer | 2/24/2005 | 40 | Georgia | Active | Diesel Pow |
| Info | AACo | Barnard, Don | Smith, Jennifer | 2/24/2005 | 40 | Georgia | Active | Alpha Indu |
| Info | Buy Co, Inc | Barnard, Don | Smith, Jennifer | 2/24/2005 | 40 | Georgia | Active | Alpha Indu |
| Info | | Barnard, Don | Smith, Jennifer | 2/24/2005 | 40 | Georgia | Active | Alpha Indu |
| Info | | Barnard, Don | Smith, Jennifer | 3/3/2005 | 40 | Georgia | Active | Alpha Indu |
| Info | AACo | Barnard, Don | Smith, Jennifer | 3/10/2005 | 40 | Georgia | Active | Alpha Indu |
| Info | AACo | Worker, Bob | Smith, Jennifer | 3/21/2005 | 40 | Georgia | Being Built | Alpha Indu |

FIG. 43

| | A | B | C | D | E | F | G | H | |
|---|---|---|---|---|---|---|---|---|---|
| | BuyingCompany | ContractorName | SellingUserName | DateCreated | EstimatedHours | LocationName | OrderStatus | SellerCustomer | Selli |
| 2 | AACo | asdf, asdf | Smith, Jennifer | 02/24/05 | 40.00 | Georgia | Active | Diesel Power, Inc | Industrial |
| 3 | AACo | Hill, Dean | Smith, Jennifer | 02/24/05 | 40.00 | Georgia | Active | Diesel Power, Inc | Industrial |
| 4 | AACo | Flora, John | Smith, Jennifer | 02/24/05 | 40.00 | Georgia | Active | Diesel Power, Inc | Industrial |
| 5 | AACo | Barnard, Don | Smith, Jennifer | 02/24/05 | 40.00 | Georgia | Active | Alpha Industries | Industrial |
| 6 | Buy Co, Inc | Barnard, Don | Smith, Jennifer | 02/24/05 | 40.00 | Georgia | Active | Alpha Industries | Industrial |
| 7 | | Barnard, Don | Smith, Jennifer | 02/24/05 | 40.00 | Georgia | Active | Alpha Industries | Industrial |
| 8 | | Barnard, Don | Smith, Jennifer | 03/03/05 | 40.00 | Georgia | Active | Alpha Industries | Industrial |
| 9 | AACo | Barnard, Don | Smith, Jennifer | 03/10/05 | 40.00 | Georgia | Active | Alpha Industries | Industrial |
| 10 | AACo | Worker, Bob | Smith, Jennifer | 03/21/05 | 40.00 | Georgia | Active | Alpha Industries | Industrial |
| 11 | | | Smith, Jennifer | 03/23/05 | 40.00 | Georgia | Being Built | Alpha Industries | Industrial |
| 12 | AACo | Barnard, Don | Smith, Jennifer | 03/23/05 | 40.00 | Georgia | Active | Alpha Industries | Industrial |
| 13 | AACo | asdf, asdf | Smith, Jennifer | 03/23/05 | 40.00 | Georgia | Being Built | Alpha Industries | Industrial |
| 14 | | | Smith, Jennifer | 03/23/05 | 40.00 | Georgia | Being Built | Alpha Industries | Industrial |
| 15 | | | Smith, Jennifer | 03/23/05 | 40.00 | Georgia | Being Built | Alpha Industries | Industrial |
| 16 | | | Smith, Jennifer | 03/23/05 | 40.00 | Georgia | Being Built | Alpha Industries | Industrial |
| 17 | | | Smith, Jennifer | 03/23/05 | 40.00 | Georgia | Active | Alpha Industries | Industrial |
| 18 | | | Smith, Jennifer | 03/23/05 | 40.00 | Georgia | Active | Alpha Industries | Industrial |
| 19 | AACo | Barnard, Don | Smith, Jennifer | 03/24/05 | 44.00 | Georgia | Being Built | Alpha Industries | Industrial |
| 20 | AACo | asdf, asdf | Smith, Jennifer | 03/24/05 | 40.00 | Georgia | Being Built | Alpha Industries | Industrial |
| 21 | | | Smith, Jennifer | 03/24/05 | 40.00 | Georgia | Being Built | Alpha Industries | Industrial |
| 22 | | | Smith, Jennifer | 03/24/05 | 40.00 | Georgia | Being Built | Alpha Industries | Industrial |
| 23 | AACo | Barnard, Don | Smith, Jennifer | 03/24/05 | 40.00 | Georgia | Active | Alpha Industries | Industrial |
| 24 | AACo | asdf, asdf | Smith, Jennifer | 03/24/05 | 40.00 | Georgia | Active | Alpha Industries | Industrial |
| 25 | | | Smith, Jennifer | 03/30/05 | 40.00 | Georgia | Being Built | Alpha Industries | Industrial |
| 26 | | Jones, Earl | Smith, Jennifer | 04/01/05 | 45.00 | Georgia | Active | Alpha Industries | Industrial |
| 27 | AACo | Barnard, Don | Smith, Jennifer | 04/02/05 | 40.00 | Georgia | Active | Alpha Industries | Industrial |

Find Orders with No Timecards

Selection Criteria

Selling Location

[Check All] [Clear All] [Expand] [Collapse]

☐ Northeast Region ?
☑ North Central Region ?
  ☑ Ohio ?
  ☑ Illinois ?
☐ Mid-Atlantic Region ?
☐ Southeast Region ?
☐ Southwest Region ?
☐ Western Region ?

[Submit] [Cancel]

Select Job Titles    All items currently selected.
Select Customer    All items currently selected.

Date Range:  Start Date        End Date
             7/24/2005         7/30/2005
             [Submit]

Melinda Baker
National Staffing

| Logout | My Account | Orders | Timecards | Invoices | Reports | Help | Administration |

Help

Find Orders with No Timecards

Selection Criteria

Select Selling Locations    3 Currently selected items.
Select Job Titles    All items currently selected.
Select Customer    All items currently selected.

Date Range: Start Date 7/24/2005    End Date 7/30/2005

[Submit]

| | ID | Start Date | End Date | Customer | Buyer | Worker | JobTitle | Sales Location | Sales Location |
|---|---|---|---|---|---|---|---|---|---|
| Info | 194267 | 1/01/05 | 6/30/06 | Acme Buying Company | jporter@acme.com | Tonya Tate | Security Specialists | Illinois | mbaker@nationalstaffing.com |
| Info | 194268 | 1/01/05 | 6/30/06 | Acme Buying Company | jporter@acme.com | Don Collier | Security Specialists | Illinois | mbaker@nationalstaffing.com |
| Info | 194270 | 3/01/05 | 6/30/06 | Acme Buying Company | canderson@acme.com | Lin Lasker | Clerks | Illinois | mbaker@nationalstaffing.com |

FIG. 48 overtime report
Main Selectors
Timecard Ending Date Ranges
From: 10/01/2005  To: 12/31/2005

Tagging Trees

Location
- Location
  - ☐ 00 Corporate
  - ☐ 01 Northeast
  - ☐ 02 Southeast
  - ☐ 03 Southwest
    - ☐ Phoenix Office
    - ☑ Phoenix Plant
  - ☑ 04 Central
  - ☐ 05 West Department
- ☑ Department Expense Code
- ☑ Expense Code Project
- ☑ Project Job Activity
- ☑ Job Activity Shift
- ☑ Shift Field Selectors:
All from: *Supplier (Pay_to)*
All from: *People Supplier*
All from: *Contract Worker*
All from: *End Date*
All from: *Est Hours*
Where: *Bill Rates$*  Between  10  and  15
All from: *Overtime Factor*
All from: *Regular Hours*
Where: *Overtime Hours*  Greater than  0
All from: *Overtime Bill$*
All from: *Total Amt$*
All from: *Buyer (email)*
All from: *Approval By (email)*
All from: *PO #*
All from: *Submit #*

FIG. 49

| | Supplier (Pay_to) | People Supplier | Contract Worker | End Date | Est Hours | Bill Rate$ | Overtime Factor | Daily Hours | Regular Hours | Overtime Hours | Overtime Bill$ | Total Amt$ | |
|---|---|---|---|---|---|---|---|---|---|---|---|---|---|
| Info | Supplier A | Supplier A | Dennison, Frank | 10/23/2005 | 40.00 | 12.00 | 1.35 | m8, t8, w8, t8.5, f8 | 40.00 | 0.50 | 8.10 | 488.10 | cdavis@workplaceb... |
| Info | Supplier A | Supplier A | Dennison, Frank | 10/30/2005 | 40.00 | 12.00 | 1.35 | m8, t8, w8, t9, f9 | 40.00 | 2.00 | 32.40 | 512.40 | cdavis@workplaceb... |
| Info | Supplier A | Supplier A | Scoggins, Paul | 10/30/2005 | 40.00 | 12.00 | 1.35 | m9, t9, w9, t9, f9 | 40.00 | 5.00 | 81.00 | 561.00 | cdavis@workplaceb... |
| Info | Supplier A | Supplier A | Turner, Jesse | 10/30/2005 | 40.00 | 12.00 | 1.35 | m8, t9, w8, t9, f9 | 40.00 | 3.00 | 48.60 | 528.60 | cdavis@workplaceb... |
| Info | Supplier A | Supplier A | Dennison, | 11/6/2005 | 40.00 | 12.00 | 1.35 | m10, | 40.00 | 10.00 | 162.00 | 642.00 | cdavis@workplaceb... |

Column Summary
Total: $23,224.93
Avg: $595.51
Max: $728.75
Min: $478.81

FIG. 50

| | A | B | C | D | E | F | G | H | I | J | K |
|---|---|---|---|---|---|---|---|---|---|---|---|
| 1 | Supplier (Pay to) | People Supplier | Contract Worker | End Date | Est Hours | Bill Rate$ | Overtime Factor | Daily Hours | Regular Hours | Overtime Hours | Overtime Bill$ |
| 2 | Supplier A | Supplier A | Dennison, Frank | 10/23/05 | 40.00 | $12.00 | 1.35 | m8, t8, w8, t8.5, f8 | 40.00 | 0.50 | $8.10 |
| 3 | Supplier A | Supplier A | Dennison, Frank | 10/30/05 | 40.00 | $12.00 | 1.35 | m8, t8, w8, t9, f9 | 40.00 | 2.00 | $32.40 |
| 4 | Supplier A | Supplier A | Scoggins, Paul | 10/30/05 | 40.00 | $12.00 | 1.35 | m9, t9, w9, t9, f9 | 40.00 | 5.00 | $81.00 |
| 5 | Supplier A | Supplier A | Turner, Jesse | 10/30/05 | 40.00 | $12.00 | 1.35 | m8, t9, w8, t9, f9 | 40.00 | 3.00 | $48.60 |
| 6 | Supplier A | Supplier A | Dennison, Frank | 11/06/05 | 40.00 | $12.00 | 1.35 | m10, t10, w10, t10, f10 | 40.00 | 10.00 | $162.00 |
| 7 | Supplier A | Supplier A | Scoggins, Paul | 11/06/05 | 40.00 | $12.00 | 1.35 | m10, t10, w10, t10, f10 | 40.00 | 10.00 | $162.00 |
| 8 | Supplier A | Supplier A | Turner, Jesse | 11/06/05 | 40.00 | $12.00 | 1.35 | m10, t10, w10, t10, f10 | 40.00 | 10.00 | $162.00 |
| 9 | Supplier B | Supplier B | Gosch, Surie | 10/15/05 | 40.00 | $11.75 | 1.50 | m9, t9, w9, t9, f9 | 40.00 | 5.00 | $88.13 |
| 10 | Supplier B | Supplier B | Gosch, Surie | 10/29/05 | 40.00 | $11.75 | 1.50 | m10, t10, w10, t10, f7 | 40.00 | 7.00 | $123.38 |
| 11 | Supplier B | Supplier B | Pollock, Sherice | 10/29/05 | 40.00 | $11.75 | 1.50 | m9, t9, w9, t8, f8 | 40.00 | 3.00 | $52.88 |
| 12 | Supplier A | Supplier A | Dennison, Frank | 11/13/05 | 40.00 | $12.00 | 1.35 | m8, t8, w8, t8, f8, s8 | 40.00 | 8.00 | $129.60 |
| 13 | Supplier A | Supplier A | Scoggins, Paul | 11/13/05 | 40.00 | $12.00 | 1.35 | m8, t8, w8, t8, f8, s8 | 40.00 | 8.00 | $129.60 |
| 14 | Supplier A | Supplier A | Turner, Jesse | 11/13/05 | 40.00 | $12.00 | 1.35 | m8, t8, w8, t8, f8, s8 | 40.00 | 8.00 | $129.60 |
| 15 | Supplier A | Supplier A | Dennison, Frank | 12/04/05 | 40.00 | $12.00 | 1.35 | m8, t8, w8, t8, f8, s8 | 40.00 | 8.00 | $129.60 |
| 16 | Supplier A | Supplier A | Turner, Jesse | 12/04/05 | 40.00 | $12.00 | 1.35 | m8, t8, w8, t8, f8, s8 | 40.00 | 8.00 | $129.60 |
| 17 | Supplier B | Supplier B | Gosch, Surie | 11/19/05 | 40.00 | $11.75 | 1.50 | m10, t10, w10, t10, f10 | 40.00 | 10.00 | $176.25 |
| 18 | Supplier B | Supplier B | Pollock, Sherice | 11/19/05 | 40.00 | $11.75 | 1.50 | m10, t10, w10, t10, f10 | 40.00 | 10.00 | $176.25 |
| 19 | Supplier B | Supplier B | Gosch, Surie | 11/26/05 | 40.00 | $11.75 | 1.50 | m9, t7, w6.5, t10, f8 | 40.00 | 0.50 | $8.81 |
| 20 | Supplier A | Supplier A | Jacobs, Karen | 10/16/05 | 40.00 | $13.50 | 1.35 | m8, t9, w9, t9, f9 | 40.00 | 4.00 | $72.90 |
| 21 | Supplier A | Supplier A | Tomlison, Craig | 10/16/05 | 40.00 | $13.50 | 1.35 | m7.5, t8, w8, t8, f9 | 40.00 | 0.50 | $9.11 |
| 22 | Supplier A | Supplier A | Jacobs, Karen | 10/23/05 | 40.00 | $13.50 | 1.35 | m8, t9, w8, t8, f8 | 40.00 | 1.00 | $18.23 |
| 23 | Supplier A | Supplier A | Jacobs, Karen | 10/30/05 | 40.00 | $13.50 | 1.35 | m8, t8, w8, t8, f10 | 40.00 | 2.00 | $36.45 |
| 24 | Supplier A | Supplier A | Jacobs, Karen | 12/11/05 | 40.00 | $13.50 | 1.35 | m8, t8, w6, t9.5, f10 | 40.00 | 1.50 | $27.34 |
| 25 | Supplier A | Supplier A | Tomlison, Craig | 12/11/05 | 40.00 | $13.50 | 1.35 | m9, t9.25, w10, t7, f10 | 40.00 | 5.25 | $95.68 |
| 26 | Supplier A | Supplier A | Wilson, Rochell | 12/11/05 | 45.00 | $13.50 | 1.35 | m8.75, t8, w10, t10, f10 | 40.00 | 6.75 | $123.02 |
| 27 | Supplier A | Supplier A | Jacobs, Karen | 12/18/05 | 40.00 | $13.50 | 1.35 | m8, t8, w8, t9, f9 | 40.00 | 2.00 | $36.45 |

FIG. 51

| | | | | | | | | | | | |
|---|---|---|---|---|---|---|---|---|---|---|---|
| | | | | | | | | Logout | My Account | Orders | Timecards | Invoices | Reports | | | |

Show View spend by category

View Options
| Change | Show |
|---|---|
| List | Save |

493 items in this list.
Export

| | Work Week | People Supplier | Contract Worker | Bill Rate$ | Tagged Hours | Spend$ | Invoice_# | TC # | Location | Department | Expense Code |
|---|---|---|---|---|---|---|---|---|---|---|---|
| Info | 9/26-10/2 | Supplier A | Dennison, Frank | 12.00 | 38.00 | 456.00 | 24588 | 3198 | Phoenix Plant | Production | 5110 Direct Labor |
| Info | 9/26-10/2 | Supplier A | Scoggins, Paul | 12.00 | 32.00 | 384.00 | 24588 | 3199 | Phoenix Plant | Production | 5110 Direct Labor |
| Info | 9/26-10/2 | Supplier A | Turner, Jesse | 12.00 | 39.00 | 468.00 | 24588 | 3200 | Phoenix Plant | Production | 5110 Direct Labor |
| Info | 9/25-10/1 | Supplier B | Gosch, Surie | 11.75 | 44.00 | 540.50 | | 3207 | Phoenix Plant | Production | 5110 Direct Labor |
| Info | 9/25-10/1 | Supplier B | Pollock, Sherice | 11.75 | 44.00 | 540.50 | | 3208 | Phoenix Plant | Production | 5110 Direct Labor |
| Info | 10/1-10/7 | Supplier C | Engle, Brenda | 11.00 | 43.00 | 486.20 | | 3209 | Phoenix Plant | Production | 5110 Direct Labor |

FIG. 53

WorkplaceBuyer1

Logout  My Account  Orders  Timecards  Invoices  Reports

View spend by category
Main Selectors
Timecard Ending Dates
From: 10/01/2005  To: 12/31/2005

Tagging Trees

Location
- □ Location
  - □ 00 Corporate
  - □ 01 Northeast
  - □ 02 Southeast
  - □ 03 Southwest
  - □ 04 Central
    - □ Chicago Office [36 in last view]
    - □ Gary Plant
  - □ 05 West
    - □ San Francisco Office [62 in last view]
    - ☑ Stockton Plant [17 in last view]

Department
- ☑ Department

Expense Code
- ☑ Expense Code

Project
- ☑ Project

Job Activity
- ☑ Job Activity

Shift
- □ Shift
  - □ Shift 1 [127 in last view]
  - ☑ Shift 2 [108 in last view]
  - □ Shift 3 [91 in last view]
  - □ N/A [167 in last view]

Field Selectors:
All from: *People Supplier*
All from: *Contract Worker*
All from: *Bill Rate$*
All from: *Tagged Hours*
All from: *Spend$*
All from: *Invoice_#*

FIG. 54

|  |  |  |  |  |  | Logout | My Account | Orders | Timecards | Invoices | Reports |  | Henry Gill WorkplaceBuyer1 |
|---|---|---|---|---|---|---|---|---|---|---|---|---|---|

Show View spend by category

View Options
| Change | Show |
|---|---|
| List | Save |

8 items in this list.
Export

| ▲ | Work Week | People Supplier | Contract Worker | Bill Rate$ | Tagged Hours | Spend$ | Invoice_# | TC # | Location | Department | Expense Code | Project | Job Activity | Shift |
|---|---|---|---|---|---|---|---|---|---|---|---|---|---|---|
| Info | 12/4-12/10 | Supplier B | McCartney, Joseph | 30.00 | 20.00 | 600.00 |  | 3993 | Stockton Plant | HR | 6620 Office Support | N/A | Clerical | Shift 2 |
| Info | 12/4-12/10 | Supplier B | McCartney, Joseph | 30.00 | 20.00 | 600.00 |  | 3993 | Stockton Plant | Operations | 6620 Office Support | N/A | Clerical | Shift 2 |
| Info | 12/11-12/17 | Supplier B | McCartney, Joseph | 30.00 | 20.00 | 600.00 |  | 3994 | Stockton Plant | HR | 6620 Office Support | N/A | Clerical | Shift 2 |
| Info | 12/11-12/17 | Supplier B | McCartney, Joseph | 30.00 | 20.00 | 600.00 |  | 3994 | Stockton Plant | Operations | 6620 Office Support | N/A | Clerical | Shift 2 |
| Info | 12/18-12/24 | Supplier B | McCartney, Joseph | 30.00 | 20.00 | 600.00 |  | 3995 | Stockton Plant | HR | 6620 Office Support | N/A | Clerical | Shift 2 |
| Info | 12/18-12/24 | Supplier B | McCartney, Joseph | 30.00 | 20.00 | 600.00 |  | 3995 | Stockton Plant | Operations | 6620 Office Support | N/A | Clerical | Shift 2 |
|  |  |  |  |  | 160.00 | $4,800.00 |  |  |  |  |  |  |  |  |

FIG. 55

Henry Gill
WorkplaceBuyer1

Logout  My Account  Orders  Timecards  Invoices  Reports

View search invoices

Field Selectors:

Where: Supplier (Pay_to) [Contains ▼] [Supplier A]
All from: *Invoice#*
Where: Invoice Date [Between ▼] [📅] [09/01/2005] and [📅] [10/31/2005]
All from: *Hours Bill$*
All from: *Tax Amt$*
All from: *Total Amt$*
All from: *Voucher Number*
All from: *Voucher Date*
All from: *Check Number*
All from: *Check Date*

[Generate View]  [Cancel]

Show | Invoices Only | ▶ |

- INVOICE -

| Sold By: | Supplier A<br>777 Mason Street<br>Baltimore, MD 54001<br>Attn: A/R<br>Tele: 888-555-5555 |
|---|---|
| Sold To: | Workplace Buyer 1<br>2633 South 15th Ave<br>Miami, FL 33126 |
| Invoice Number: | 23899 |
| Invoice Date: | 5/24/2006 |
| Reviewed By: | |
| Reviewer Notes: | |
| Bill Amount: | 13,897.54 |
| Tax Amount: | 0.00 |
| Total Amount: | 13,897.54 |
| Payment Terms: | Net 30 |
| Supplier Notes: | |

TO FIG. 59B

FROM FIG. 59A

This invoice is for the following time cards.

| Contractor Name | Dates | Bill Rate | Regular Hours | Reg Billing | OT Hours | OT Billing | Add On Amount | Tax Amount | Total Amount | PO/ Req# | Order By/Approved By Email |
|---|---|---|---|---|---|---|---|---|---|---|---|
| Brewer, Tagg | 10/10-10/16 | 75.00 | 40.00 | 3,000.00 | 0.00 | 0.00 | 0.00 | 0.00 | 3,000.00 | VST-88723 | Ordered:pschmidt@workplacebuyer1.com Approved:pschmidt@workplacebuyer1.com |
| Dermin, Susan | 10/10-10/16 | 32.76 | 40.00 | 1,310.40 | 0.00 | 0.00 | 0.00 | 0.00 | 1,310.40 | 89-0889u8 | Ordered:obennett@WorkplaceBuyer1.com Approved:Obennett@workplacebuyer1.com |
| James, Ken | 10/10-10/16 | 32.76 | 40.00 | 1,310.40 | 0.00 | 0.00 | 0.00 | 0.00 | 1,310.40 | 89-0889u8 | Ordered:obennett@WorkplaceBuyer1.com Approved:Obennett@workplacebuyer1.com |
| Peters, Joyce | 10/10-10/16 | 75.00 | 40.00 | 3,000.00 | 11.00 | 825.00 | 0.00 | 0.00 | 3,825.00 | VST-88723 | Ordered:pschmidt@workplacebuyer1.com Approved:pschmidt@workplacebuyer1.com |
| Steward, John | 10/10-10/16 | 32.76 | 40.00 | 1,310.40 | 1.50 | 66.34 | 0.00 | 0.00 | 1,376.74 | 89-0889u8 | Ordered:obennett@WorkplaceBuyer1.com Approved:Obennett@workplacebuyer1.com |
| Wesley, Keith | 10/10-10/16 | 75.00 | 40.00 | 3,000.00 | 1.00 | 75.00 | 0.00 | 0.00 | 3,075.00 | VST-88723 | Ordered:pschmidt@workplacebuyer1.com Approved:pschmidt@workplacebuyer1.com |
| | | | 240.00 | 12,931.20 | 13.50 | 966.34 | 0.00 | 0.00 | 13,897.54 | | |

Tagging Information for this Invoice

| $ Applied | Location | Expense Code |
|---|---|---|
| 9900.00 | Phoenix Office- | 6810 PC Technician- |
| 3997.54 | San Francisco Office- | 6620 Office Support- |

| Show | Invoices Only |
| --- | --- |
| | Invoices Only |
| | Invoices with Time Cards |
| -INV | Invoices with Time Cards and Order Summary |
| | Invoices with Time Cards, Order Summary, and Accounting Info |

| Sold By: | 777 Mason Street |
| --- | --- |
| | Baltimore, MD 54001 |
| | Attn: A/R |
| | Tele: 888-555-5555 |
| Sold To: | Workplace Buyer 1 |
| | 2633 South 15th Ave |
| | Miami, FL 33126 |
| Invoice Number: | 23899 |
| Invoice Date: | 5/24/2006 |
| Reviewed By: | |
| Reviewer Notes: | |
| Bill Amount: | 13,897.54 |
| Tax Amount: | 0.00 |
| Total Amount: | 13,897.54 |
| Payment Terms: | Net 30 |
| Supplier Notes: | |

TO FIG. 60B

FROM FIG. 60A

This invoice is for the following time cards.

| Contractor Name | Dates | Bill Rate | Regular Hours | Reg Billing | OT Hours | OT Billing | Add On Amount | Tax Amount | Total Amount | PO/ Req# | Order By/Approved By Email |
|---|---|---|---|---|---|---|---|---|---|---|---|
| Brewer, Tagg | 10/10-10/16 | 75.00 | 40.00 | 3,000.00 | 0.00 | 0.00 | 0.00 | 0.00 | 3,000.00 | VST-88723 | Ordered:pschmidt@workplacebuyer1.com Approved:pschmidt@workplacebuyer1.com |
| Dermin, Susan | 10/10-10/16 | 32.76 | 40.00 | 1,310.40 | 0.00 | 0.00 | 0.00 | 0.00 | 1,310.40 | 89-0889u8 | Ordered:obennett@WorkplaceBuyer1.com Approved:Obennett@workplacebuyer1.com |
| James, Ken | 10/10-10/16 | 32.76 | 40.00 | 1,310.40 | 0.00 | 0.00 | 0.00 | 0.00 | 1,310.40 | 89-0889u8 | Ordered:obennett@WorkplaceBuyer1.com Approved:Obennett@workplacebuyer1.com |
| Peters, Joyce | 10/10-10/16 | 75.00 | 40.00 | 3,000.00 | 11.00 | 825.00 | 0.00 | 0.00 | 3,825.00 | VST-88723 | Ordered:pschmidt@workplacebuyer1.com Approved:pschmidt@workplacebuyer1.com |
| Steward, John | 10/10-10/16 | 32.76 | 40.00 | 1,310.40 | 1.50 | 66.34 | 0.00 | 0.00 | 1,376.74 | 89-0889u8 | Ordered:obennett@WorkplaceBuyer1.com Approved:Obennett@workplacebuyer1.com |
| Wesley, Keith | 10/10-10/16 | 75.00 | 40.00 | 3,000.00 | 1.00 | 75.00 | 0.00 | 0.00 | 3,075.00 | VST-88723 | Ordered:pschmidt@workplacebuyer1.com Approved:pschmidt@workplacebuyer1.com |
| | | | 240.00 | 12,931.20 | 13.50 | 966.34 | 0.00 | 0.00 | 13,897.54 | | |

Tagging Information for this Invoice

| $ Applied | Location | Expense Code |
|---|---|---|
| 9900.00 | Phoenix Office- | 6810 PC Technician- |
| 3997.54 | San Francisco Office- | 6620 Office Support- |

FIG. 60B

INFORMATION CAPTURE, PROCESSING AND RETRIEVAL SYSTEM AND METHOD OF OPERATING THE SAME

This application claims the benefit of U.S. Provisional Application No. 60/733,368, entitled "Tracking and Reporting System for People," filed on Nov. 4, 2005, which is incorporated herein by reference.

TECHNICAL FIELD

The present invention is directed, in general, to computer information systems and, in particular, to an information capture, processing and retrieval system and method operating the same.

BACKGROUND

The need and desire of workplace firms, and the people suppliers who serve them, to efficiently source, administer, and report on temporary and contract workers has been prevalent for a long time in the staffing industry. For a variety of business and economic reasons, the use of interdepartmental, temporary and contract workers has become an increasingly important dimension at a large number of workplace companies. Accordingly, the direct and indirect costs associated with temporary and contract staffing has become a significant component both within individual departments and in these companies as a whole. The aforementioned costs represent an expenditure that companies need to better understand, control, account and report upon.

For many companies, the expenditure for such workers is the largest company expenditure that is not subject to the internal control procedure of a purchase order system. This is primarily because the expenditure for temporary workers cannot usually be quantified prior to the actual incurring of the expense due to overtime rules (and other formula based charges) and both the number of hours and duration of days worked being typically indeterminate at the time of an order. The aforementioned is further complicated by the fact that no single supplier, no matter how large, has a lock on the best people or is competent in providing trained workers for all types of jobs or recruits in all local (geographic) markets. Thus, the company faces the two realities, namely, that it cannot issue purchase orders for the expenditure and it cannot use one supplier as a single point of control and reporting source for the expenditure.

One common response has historically been to establish a single supplier as a "vendor on premise" or "master vendor," allowing that supplier to have first right of refusal to supply all of the workers needed and requiring them to subcontract to others for whatever need they cannot meet. While this may appear to be an efficient method of streamlining the process, it has historically been very costly and usually breaks down in implementation and reporting.

A second common response has historically been to interject a very inefficient and expensive software middleman (often internet based), referred to as a vendor management system ("VMS"), directly into the procurement and reporting process to allow a measure of control and create proprietary reporting. A VMS is typically installed at one workplace company at a time, much like an enterprise accounting system. Again, while this may also appear to be a good solution, the middleman fee is extremely high for supplier firms in a low margin industry, and the entry and manipulation of data that is required by a VMS makes a supplier literally learn and interface with a new system every time they serve a new client that has deployed a VMS. Further, the reporting provided to the buyer is limited and inflexible. For these reasons and more, certain suppliers decline to use any VMS at all, and the VMS is not accepted by a vast majority of suppliers.

The most common response is, because of the high costs and heavy commitment, to merely decline the possibilities of any control, tracking, and reporting on these types of expenditures. This is often the course taken by companies, especially small and medium sized firms, that buy temporary labor.

Accordingly, what is needed in the art is a streamlined, inexpensive system where any people supplier can efficiently capture time in multiple, necessary, firm-by-firm customized ways as a reliable foundation for robust reporting and where any buyer of labor such as temporary labor can interface with multiple (e.g., hundreds) of people suppliers in multiple geographic areas and, in that process, self tag time worked on a customized basis peculiar to that buyer (e.g., department codes, expense codes, locations), then easily obtain reporting customized to that buyer on a self serve, instant demand basis. The system should provide like functionality to any supplier of labor in working with a multitude (e.g., hundreds) of buyers.

SUMMARY OF THE INVENTION

These and other problems are generally solved or circumvented, and technical advantages are generally achieved, by advantageous embodiments of the present invention, which includes an information capture, processing and retrieval ("ICPR") system shared by multiple buyers, multiple suppliers and multiple workers concurrently, and a method of operating the same. In one embodiment, the ICPR system includes an order documentation subsystem configured to document orders for the suppliers and the buyers with respect to the workers. Each of the orders specifies a different method of time capture for the workers assigned thereto. The ICPR system also includes a time capture subsystem configured to receive the different methods of time capture from the workers positioned in one of anchored and untethered locations assigned to the orders. In a related embodiment, the ICPR system further includes a time approval and buyer tagging subsystem configured to allow the buyers to label time worked by the workers corresponding to the buyers with one or more tags, thereby translating approved time of the workers into custom, internal terminology of the buyers.

In another aspect, the ICPR system is shared by multiple buyers, multiple suppliers and multiple workers concurrently and includes a time capture subsystem configured to receive time worked by the workers of the suppliers. The ICPR system also includes a time approval and buyer tagging subsystem configured to allow the buyers to label the time worked by the workers corresponding to the buyers with one or more tags, thereby translating approved time of the workers into custom, internal terminology of the buyers. In a related, but alternative embodiment, the ICPR system further includes an order documentation subsystem configured to allow the suppliers to label orders between the suppliers and the buyers associated with time of the workers corresponding thereto with one or more tags, thereby translating the time of the workers into custom, internal terminology of the suppliers.

In another aspect, the ICPR system is shared by multiple buyers, multiple suppliers and multiple workers concurrently and includes an order documentation subsystem configured to document orders for the suppliers and the buyers with respect to the workers and allow the suppliers to label the orders associated with time of the workers corresponding thereto with one or more tags, thereby translating the time of the workers into custom, internal terminology of the suppliers. In a related, but alternative embodiment, the ICPR system further includes a time capture subsystem configured to receive time worked by the workers of the suppliers. In another related, but alternative embodiment, the ICPR system further includes a time approval and buyer tagging subsystem configured to allow the buyers to label time worked by the workers corresponding to the buyers with one or more tags, thereby translating approved time of the workers into custom, internal terminology of the buyers.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIGS. 10 to 60 illustrate screen shots from a computer demonstrating a method of operating an information capture, processing and retrieval system according to the principles of the present invention.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. Unless otherwise provided, like designators for devices employed in different embodiments illustrated and described herein do not necessarily mean that the similarly designated devices are constructed in the same manner or operate in the same way.

The present invention will be described with respect to an exemplary embodiment in a specific context, namely, an information capture, processing and retrieval ("ICPR") system. The particular embodiments described herein are applied to examples prevalent in the staffing industry. In addition, the FIGUREs herein and accompanying description may use definitive language for the sake of specific examples. It should be understood that the definitive language may be replaced with permissive language in accordance with the principles of the present invention.

Figure 1:
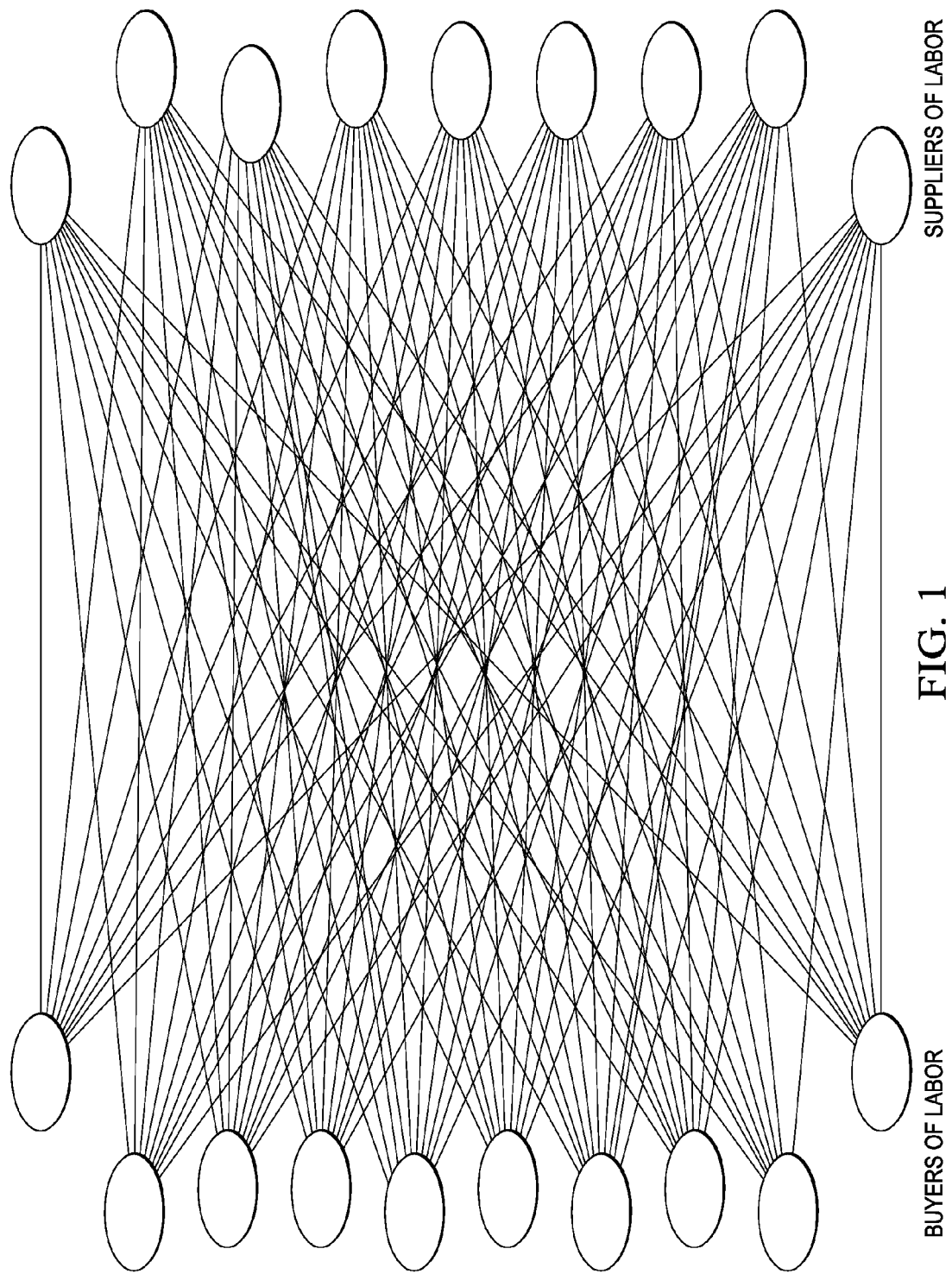
FIG. 1 illustrates a system level diagram demonstrating limitations associated with the conventional approach to the staffing industry.

Referring initially to FIG. 1, illustrated is a system level diagram demonstrating limitations associated with the conventional approach to the staffing industry. The typical circumstance in the staffing industry is that each supplier uses an independent system of time capture (often paper time cards). Thus, the typical buyer of staffing services from multiple suppliers does not enjoy a uniform approach to approving time or reviewing standard reports derived from time capture. The result is a very inefficient morass of different time collection methods and reporting approaches that render effective use and interpretation of staffing moot for buyers of staffing. As a result, the "spaghetti like" maze leads to a very complex relational and reporting system between buyers and suppliers of labor in the staffing industry occurs as illustrated with respect to FIG. 1. The maze demonstrates the complex status of time collection and reporting of labor in the staffing industry without implementing an ICPR system according to the principles of the present invention.

Figure 2:
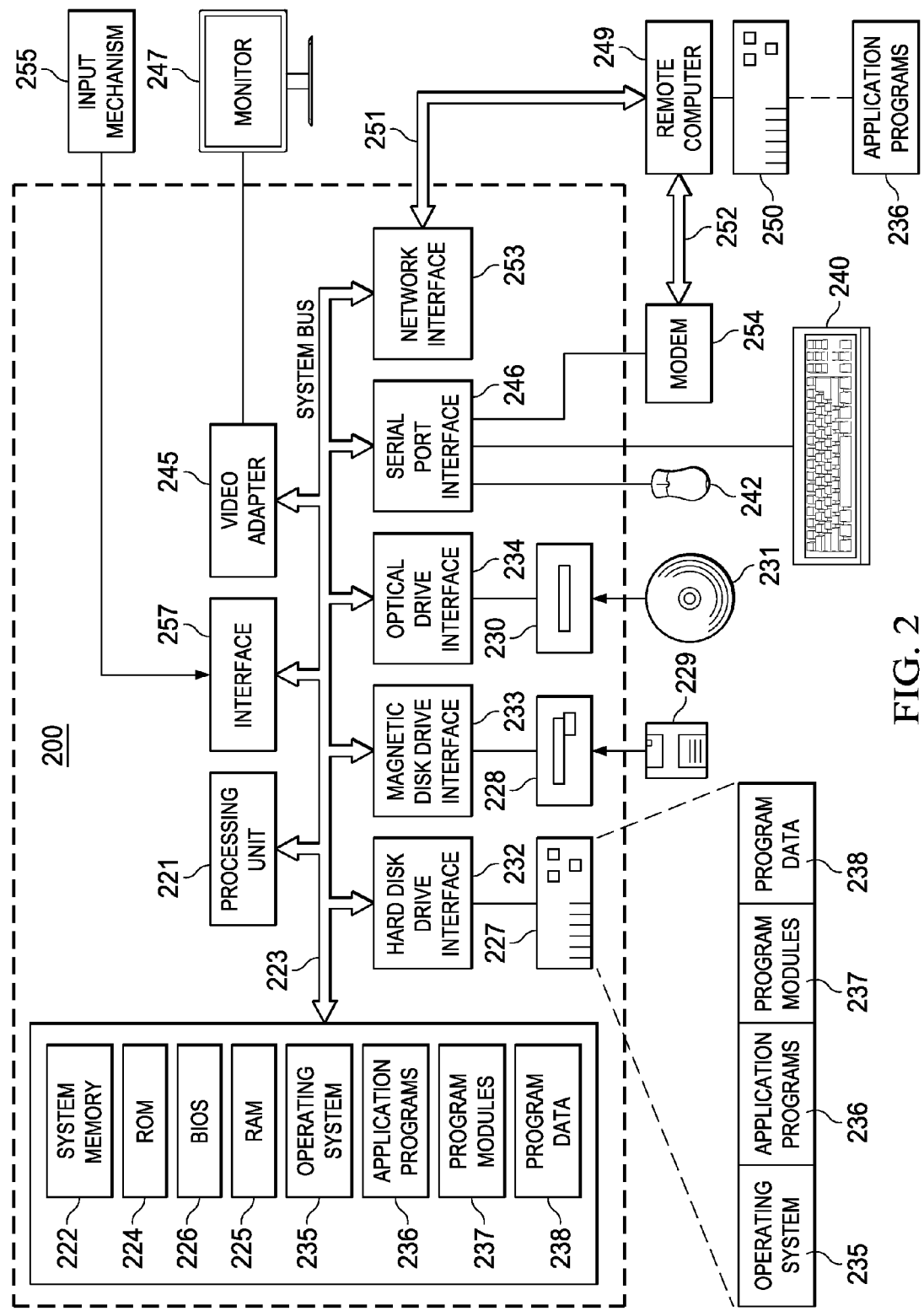
FIG. 2 illustrates a block diagram of an embodiment of a computer system that provides an environment for an information capture, processing and retrieval system according to the principles of the present invention.

Turning now to FIG. 2, illustrated is a block diagram of an embodiment of a computer system 200 that provides an environment for an ICPR system according to the principles of the present invention. While the present invention is not limited thereto, the computer system 200 is a personal computer ("PC"). Additionally, the ICPR system including the subsystems and modules thereof may be embodied in hardware, software including program modules, and combinations thereof. Generally, program modules include routines, programs, objects, components, data structures, etc. that perform particular tasks or implement particular abstract data types. Moreover, those skilled in the art will appreciate that the ICPR system may be practiced with other computer system configurations including handheld devices, multiprocessor systems, microprocessor based or programmable consumer electronics, network PCs, minicomputers, mainframe computers, and the like. The ICPR system may also be practiced in distributed computing environments where tasks are performed by remote processing devices that are linked through a communications network. In a distributed computing environment, program modules may be located in both local and remote memory storage devices.

As shown, the computer system 200 includes a processing unit 221, a system memory 222, and a system bus 223. The system bus 223 links together various system components including the system memory 222 and the processing unit 221. The system bus 223 may be any of several types of bus structures including a memory bus or memory controller, a peripheral bus, and a local bus using any of a variety of bus architectures. The system memory 222 typically includes read only memory ("ROM") 224 and random access memory ("RAM") 225. A basic input/output system 226 ("BIOS"), containing the basic routine that helps to transfer information between elements within the computer system 200, such as during startup, is stored in the ROM 224.

The computer system 200 further includes a hard disk drive 227 for reading from and writing to a hard disk, not shown, a magnetic disk drive 228 for reading from or writing to a removable magnetic disk 229, and an optical disk drive 230 for reading from or writing to a removable optical disk 231 such as a CD ROM or other optical media. The hard disk drive 227, magnetic disk drive 228, and optical disk drive 230 are connected to the system bus 223 by a hard disk drive interface 232, a magnetic disk drive interface 233, and an optical drive interface 234, respectively. These drives and their associated computer readable media provide nonvolatile storage of computer readable instructions, data structures, computer programs and other data for the computer system 200.

A number of computer programs may be stored on the hard disk, magnetic disk 229, optical disk 231, ROM 224 or RAM 225, including an operating system 235, one or more application programs 236, other programs 237, and program data 238. A user may enter commands and information into the computer system 200 through various input devices such as a keyboard 240 and pointing device 242 (such as a mouse, etc.). An additional input mechanism(s) 255 can also be included via an appropriate interface 257.

As shown, a monitor 247 or other type of display device is also connected to the system bus 223 via an interface, such as a video adapter 245. In addition to the monitor 247, the computer system 200 may also include other peripheral output devices (not shown), such as speakers, printers, etc.

The computer system 200 may operate in a networked environment using logical connections to one or more remote computers, such as a remote computer 249. The remote computer 249 may be another personal computer, a server, a router, a network PC, a peer device or other common network node, and typically includes many or all of the elements described above relative to the computer system 200, although only a memory storage device 250 has been illustrated in FIG. 2.

The logical connections depicted in FIG. 2 include a local area network ("LAN") 251 and a wide area network ("WAN") 252. Such networking environments are commonplace in offices, enterprise wide computer networks, Intranets and the Internet. When used in a LAN networking environment, the computer system 200 is connected to the local network 251 through a network interface or adapter 253. When used in a WAN networking environment, the computer system 200 typically includes a modem 254 or other means for establishing communications over the wide area network 252, such as the Internet. The modem 254, which may be internal or external, is connected to the system bus 223 via a serial port interface 246.

In a networked environment, computer programs depicted relative to the computer system 200, or portions thereof, may be stored in the remote memory storage device. It will be appreciated that the network connections shown are exemplary and that other means of establishing a communications link between the computers may be used.

In accordance with the ICPR system, comprehensive, integrated time capture methods and coverage provide a foundation for reliable, comprehensive reporting for any enterprise that buys services from multiple staffing suppliers. This is especially true for geographically diverse buyers of staffing services. As hereinafter described, the ICPR system approach provides multiple flexible options for time capture.

Figure 3:
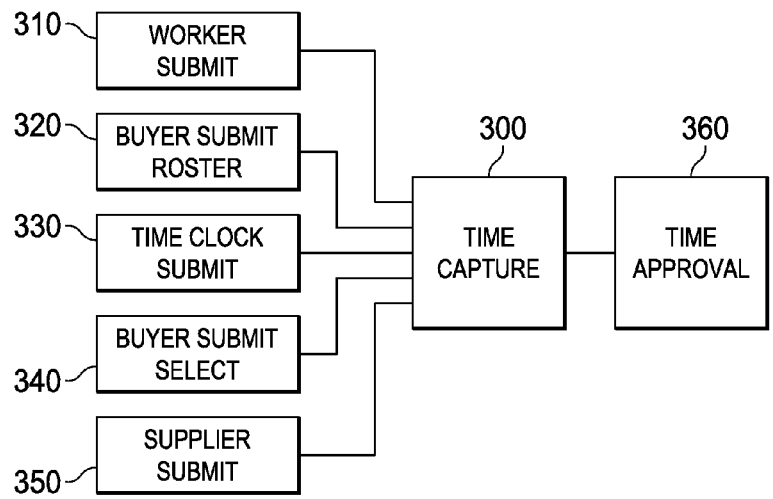
FIG. 3 illustrates a block diagram of an exemplary embodiment of capturing time in accordance with the principles of the present invention.

In accordance therewith, FIG. 3 illustrates a block diagram of an exemplary embodiment of capturing time in accordance with the principles of the present invention. A time capture subsystem 300 of the ICPR system provides the flexibility for multiple suppliers to use the same time clock or multiple time capture methods, thereby allowing any supplier to seamlessly work with an unlimited number of buyers diverse both geographically and in worker profiles required. Simultaneously, it also allows any buyer to seamlessly work with an unlimited number of suppliers diverse both geographically and in worker profiles delivered.

More specifically, the ICPR system allows for worker submit subsystem 310, wherein a worker submits the time via the web using any browser. Another methodology to submit time is via a buyer submit roster subsystem 320, wherein a buyer of labor submits time by way of a roster of workers via the web using any browser. Yet another way to submit time is by way of a universal time clock submit subsystem 330, wherein the time is submitted typically through a worker entering time on a time clock via a swipe card or touch screen. The universal time clock submit subsystem 330 is universal in that many suppliers may have their workers use the same physical time clock daily without, typically, requiring a machine to be dedicated solely to one supplier at a time. Time may also be submitted through a buyer submit select subsystem 340, wherein a buyer of labor submits time by way of specific labor time of a worker via the web using any browser. Another way to submit time is by way of a supplier submit subsystem 350, wherein a supplier of time submits the time via the web using any browser. The ICPR system, therefore, can accommodate many buyers of labor and suppliers of labor to submit time via disparate subsystems even while reviewing and editing the time via the web from any browser. Additionally, the workers' time can be approved via a time approval subsystem 360.

With the ICPR system, buyers and suppliers are not constrained by diverse staffing practices. The ICPR system design serves multiple profiles of workers (e.g., industrial to medical to professional) needing multiple ways to input time (e.g., time clock, web based self input) and customized configuration needs driven by suppliers or buyers (e.g., special billing units, shift differentials) in an unlimited number of both necessarily specifically anchored locations (i.e., a physical time clock that validates specific physical presence at specific times by specific individuals) and untethered locations (i.e., time input via any wired or wireless connected personal computer or laptop).

Depending upon the working relationship between and the configuration elected by the buyer and supplier participants, the party entering the time using these various options may alternatively be the worker, the buyer, or the supplier. The time collection appliance selected may be either any personal computer located anywhere in the world or a specifically located time clock whose authorized participating workers for any given week are authorized by a potentially unlimited number of suppliers inputting orders for those workers from remote personal computers. Hence, the ICPR system 300 is universal in that an unlimited number of suppliers may have their workers use the time capture system via multiple methods without, typically, requiring a machine to be dedicated solely to one supplier at a time.

Also, depending upon configurations selected, the buyer or the supplier may edit the time captured by the time clock prior to the approval by the designated person. The ICPR system then allows buyer supervisory personnel to subsequently approve the time. Alternatively, the supplier may approve the time captured if the buyer is not designed to be in the approval process in order for the supplier to properly obtain comprehensiveness in its payroll and billing information. The ICPR system multi option time capture and universal time clock stand alone as a streamlined, customized, comprehensive time collection subsystem.

Figure 4:
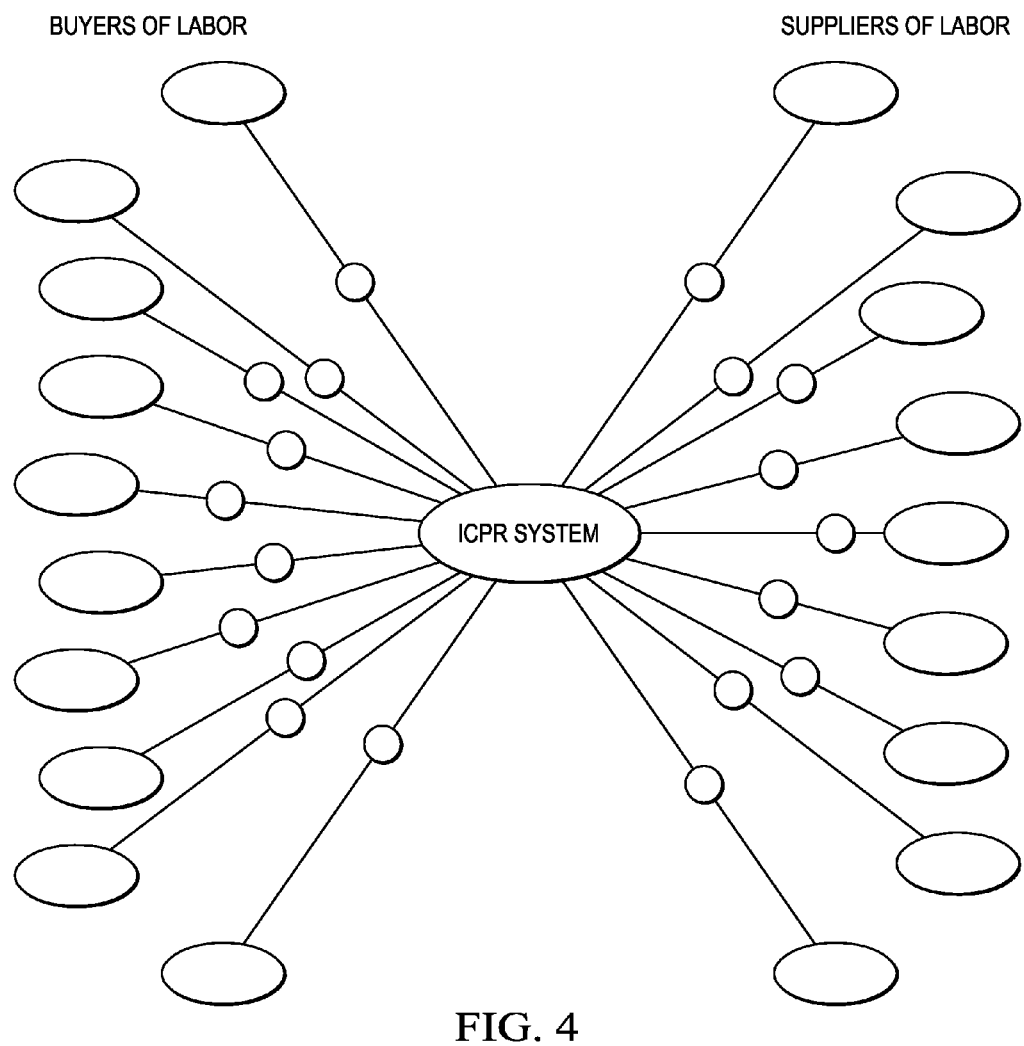
FIG. 4 illustrates a system level diagram demonstrating the advantages of the information capture, processing and retrieval system in accordance with the principles of the present invention.

Turning now to FIG. 4, illustrated is a system level diagram demonstrating the advantages of the ICPR system in accordance with the principles of the present invention. Initially, a system administrator for each company or department is established and allowed to access the ICPR system via, for instance, an ICPR system website. The system administrators configure their respective business process rules that their end users will subsequently follow when completing work orders and time cards.

First, the suppliers enter the particulars of each order agreed upon between the buyer and the supplier. This order information is in essence the "purchase order" for which weekly time card submissions and approvals function as "receivers" that document a volume component to any particular weekly transaction. In this fashion, an open order may have differing weekly contract amounts that result from the product of the pricing (from the order) and the volume (from the time card submission).

The end users then jointly manage and track the follow on time card submissions and approvals for each worker engaged. Once time cards are approved, the ICPR system manages the calculation and electronic presentation of the invoice data to the workplace firm and the presentation of the payroll hours to the supplier. In essence, the ICPR system access via the internet functions as both the processing engine and the secure receptacle of data for the activities of both the buyer and the supplier.

While certain portions of the transactional information are necessarily segregated and kept private, other (predisclosed) portions are shared between the transaction parties. This enables enhanced coordination of each transaction and the business processes for each participant, and results in a more efficient, lower cost procurement and administrative system for both. Then, as a result of combining the shared transactional information with the segregated private information, each participant has robust, instantly refreshable data for various types of control, oversight, and management reporting.

An attribute of the ICPR system (integrated with the ICPR time capture) is that the ICPR system is a web based service with web browsers for access. Also, the ICPR system is a simplified, streamlined approach for personnel at people suppliers to record an initial work order, for workers (or their appointed surrogates, to provide flexibility to suppliers, or their buyers, or both) to record time either via a physical time clock or web access, and for the workplace buyer to approve the time. The aforementioned functionality is performed manually in conventional systems. Further, the people supplier can manage multiple orders at multiple customers using the detailed transactional data for each worker. This data, combined with the custom tagging (e.g., selling location, customer name, job title) initiated by each supplier upon entering the order, can be organized in reports meaningful to the supplier.

Once a buyer configures the ICPR system website with its specific, customized business process rules and begins receiving time card submissions through the ICPR system, the system can execute custom tagging for the buyer. The custom tagging accommodates tagging weekly time card data in the specific business language (e.g., job titles, expense codes, locations, departments) of the buyer firm. Each buyer firm can comprehensively translate (using its specific language) approved time card activity from an unlimited number of multiple suppliers into reportable information specific to the buyer with no effort on the part of the suppliers. The buyer then has self serve, instant access "24/7" via, for instance, the web, to the detailed transactional data for each worker and, by query based compilation and analysis, the data for multiple workers in any combination of attributes the particular user desires. For instance, the ICPR system accommodates the detail of the amount the buyer firm spent and the bill rates charged by multiple suppliers for forklift operators at Boston, Peoria, and Phoenix plants between November 10 to December 24 of last year. Each report request is delivered in mere seconds; the buyer user of the ICPR system can then simply change one or more attributes and get a freshly revised report with different attributes, again in mere seconds.

Additionally, the buyer user may immediately access other completely customized reports (e.g., accrual reports, seasonality of labor reports, operating reports) necessary to operate a company or complying with government regulations such as Sarbanes Oxley. This infinite number of combinations of data reported upon is available and comparable, no matter how many different people suppliers are participating. From the buyer procurement reporting perspective, it is as if there is a single supplier that is integrated into the procurement and financial processes. This is in direct contrast with multiple suppliers providing reports from proprietary systems in significantly differing formats and disclosures, resulting in an extremely complex "spaghetti" effect to the buyer as illustrated with respect to FIG. 1. Thus, the comprehensive translation to specific custom language by each party across multiple staffing relationships with no effort by the other party to the transaction is a stark advantage of the ICPR system.

The buyer access and functionality in the ICPR system is available without any supplier needing to receive any special training or access specific to a particular buyer and without any time or effort expended by the suppliers. To accomplish all this, a participating supplier merely spends less than a minute to create a standing order for each worker; of which the standing order is used as the authorizing document for time worked each week for the duration of time the worker is serving the buyer. Another equally important attribute is that the individual workplace buyer (end user) can select the local supplier who serves him best, instead of being forced to work through a single requisition process that was chosen by a corporate procurement office and may not be capable or responsive to his particular need.

Figure 5:
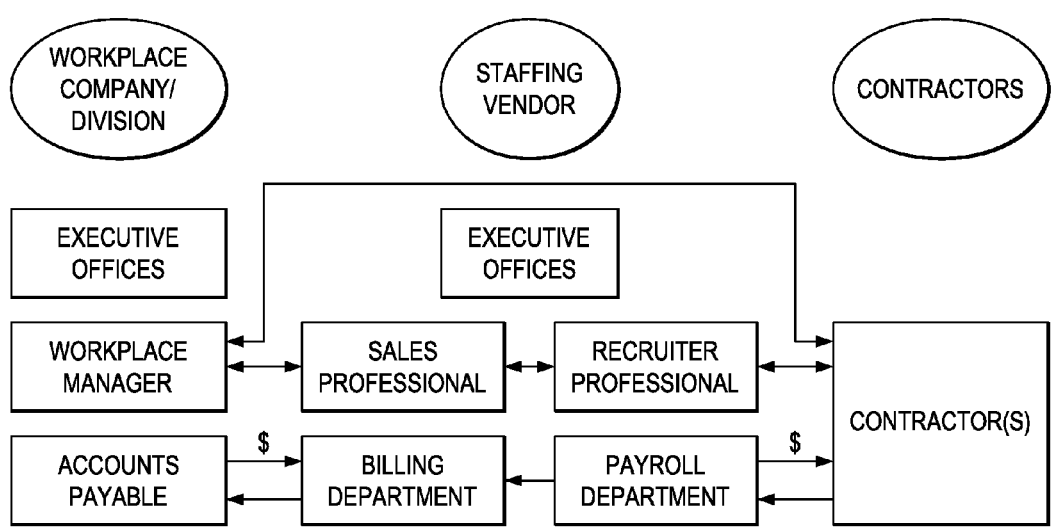
FIG. 5 illustrates a block diagram demonstrating limitations associated with conventional staffing fulfillment and vendor management systems.

As illustrated with respect to FIG. 5, in VMS and spend management system ("SMS") procurement systems, a primary, even overriding, purpose is to disrupt the relationship between the buyer's workplace manager and the staffing sales professional in order to obtain the lowest cost possible via a centralized procurement process. Also, conventional systems often require multiple invoices to the accounts payable department of the workplace and time and attendance reporting from the worker is often a manual process. The ICPR system eschews this approach because purchasing staffing services centrally is rarely the route to true value and productivity for the buyer; workers simply are not commodities or "commoditizable," at least to the supervisor who must supervise them in the workplace. Rather, the ICPR system focuses on the bottom portion of FIG. 5, allowing the contractual information, subsequently "custom tagged," to later report to the buyer company the financial results and productivity of the purchase.

The ICPR system, with the tool of custom tagging, is a transaction recording and translation system, as opposed to a proprietarily configured VMS or SMS that requires special training for every supplier for each and every buyer that uses a particular VMS or SMS. Most corporate administrators can, with the ICPR system, complete their setup and configuration in a few days, unlike a typical VMS or SMS setup that usually takes several months to configure and roll out. The ICPR system is extended to buyers for their tracking and reporting on employees, and contrasting employee costs to temporary worker costs.

The typical legacy of master vendor relationships (where a supplier firm is retained by a buyer to supervise and report upon all other vendors) is one of dramatic cost inefficiencies and reporting problems. The ICPR system is designed not only to help a single vendor serve its workplace firm clients, the ICPR system dramatically reduces the complexities of a master vendor in tracking, processing, and invoicing the very workers that the master vendor is being provided and invoiced to by subvendors in the ICPR system. In this way, the ICPR system has two suppliers for the same worker, serving both the master vendor and the subvendor.

Figure 6:
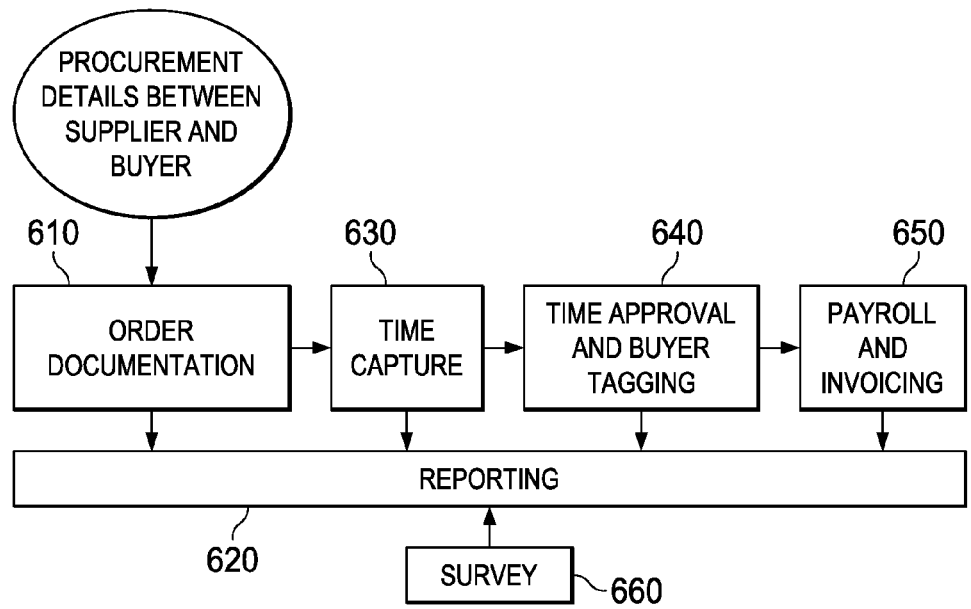
FIGS. 6 to 9 illustrate block diagrams of exemplary embodiments of information capture, processing and retrieval systems according to the principles of the present invention.

In this fashion, the ICPR system links together comprehensive order documentation, multiple time capture methods, custom buyer tagging, and payroll/invoice integration, and all the while offers a plethora of unlimited reporting options at every step of the way (see FIG. 6, et seq.). Because the ICPR system employs, for instance, the web, to move way beyond fixed, proprietary systems like enterprise resource planning ("ERP") systems or VMS systems, one supplier can then engage in staffing activity comprehensively with an unlimited number of buyers, and one buyer can also simultaneously engage in staffing activity comprehensively with an unlimited number of suppliers.

Turning now to FIGS. 6 to 9, illustrated are block diagrams of exemplary embodiments of an ICPR system constructed according to the principles of the present invention. The ICPR system is shared by multiple buyers (e.g., multiple different buyers such as different entities), multiple suppliers (e.g., multiple different suppliers such as different entities) and multiple workers concurrently. The ICPR system receives procurement details between the buyers and suppliers and prepares order documentation via an order documentation subsystem 610. The order documentation subsystem 610 provides the information to a reporting subsystem 620. The order documentation subsystem 610 documents orders for the suppliers and the buyers with respect to the workers. Each of the orders can specify different methods of time capture for the workers assigned thereto. The order documentation subsystem 610 also allows the suppliers to label the orders associated with the time of the workers and financial revenue corresponding thereto with one or more tags, thereby translating the time of the workers into custom, internal terminology of the suppliers for reporting. When the worker performs the work, the ICPR system captures the time via a time capture subsystem 630. The time may be captured in any number of ways as illustrated and described with respect to FIG. 3 and from the workers positioned in one of anchored and untethered locations assigned to the orders. Again, the information about the captured time is provided to the reporting subsystem 620.

Once the time has been captured, the buyer may access the time capture status via access to the ICPR system or the ICPR system provides a notice to the buyer to approve and tag the time via a time approval and buyer tagging subsystem 640. The information about the approved and tagged time is provided to the reporting subsystem 620. The time approval and buyer tagging subsystem 640 allows the buyers to label time worked by the workers corresponding to the buyers with one or more tags, thereby translating approved time of the workers and the related financial expense into custom, internal terminology of the buyers for reporting. Additionally, the approved and tagged time is provided to a payroll and invoicing subsystem 650. The payroll and invoicing subsystem 650 provides payroll information about the workers and invoices the buyers for approved time. As before, the information about the payroll and invoicing is provided to the reporting subsystem 620. Additionally, the ICPR system includes a mechanism for a buyer to accumulate feedback about suppliers and workers via a survey subsystem 660, which information is provided to the reporting subsystem 620. Thus, the survey subsystem 660 captures, compiles and processes survey answers by the buyers regarding the orders. The reporting subsystem 620, therefore, provides reports about the survey answers. The ICPR system can accommodate a multitude of different buyers, suppliers and workers using the same system, while maintaining the privacy and unique characteristics of the specific relationships.

Figure 7:
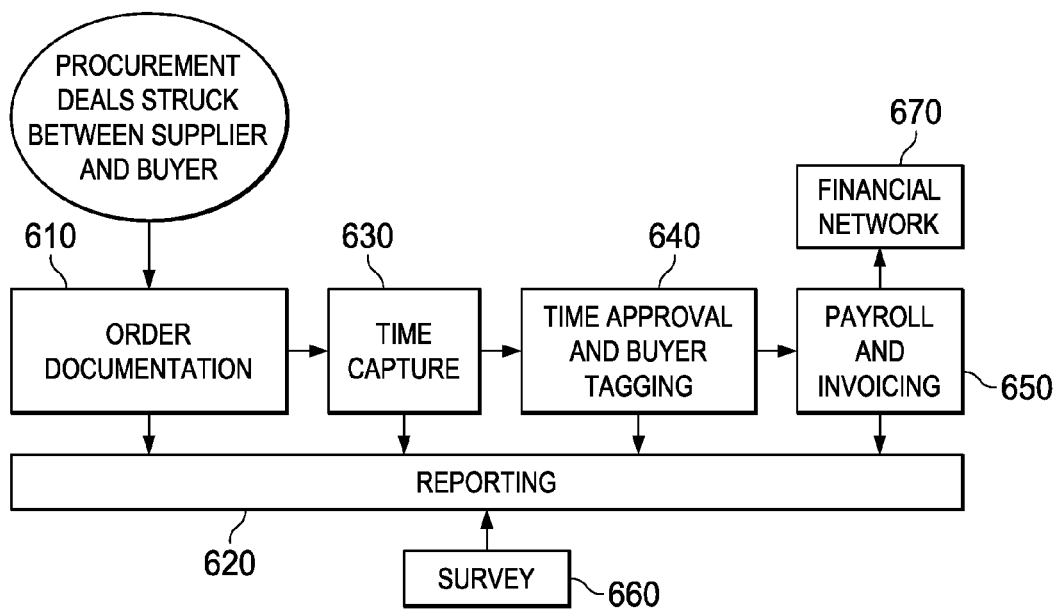

Regarding the ICPR system and as illustrated in FIG. 7, a financial network subsystem 670 provides a streamlined subsystem for the support, collection, and reporting processes for lending in the staffing industry, as well as to address three key factors that create very problematic issues for typical staffing suppliers and their lenders, as follows. First, the buying of staffing services involves a unique procurement process that typically lacks the issuance of a traditional purchase order. The parties initially only agree to the hourly bill rate for the worker and then wait until the end of each work week to learn of the actual hours worked or delivered, thereby determining the actual dollar amount spent. This lack of normal purchase order procurement documentation not only creates the need for the ICPR system tracking of weekly purchases by the buying company, it also creates some unique invoicing and accounts receivable financing support issues for the staffing supplier.

Second, the staffing suppliers often use time card approaches (e.g., paper time cards) that are not easily accessible to a lender wanting to determine the validity of financed invoices. Especially given that purchase orders are not typically issued, this lack of time cards clearly approved and linked as supporting detail for invoices not only creates the need for the ICPR system invoicing to the buying company, it also creates more unique invoicing and accounts receivable support issues.

Third, the staffing suppliers typically have very short and inflexible accounts payable terms (i.e., weekly or bi weekly payroll) while experiencing much longer accounts receivable realities (say, 35 to 50 days outstanding). This creates a significant need for capital to finance receivables, especially for a supplier that is growing or could grow. Unfortunately, the staffing suppliers' owners typically have relatively low net worths and their firms typically earn very low earnings before income taxes, depreciation, and amortization ("EBITDAs") such as one to three percent. Accordingly, these firms need very high percentages of receivables financed (90% or higher), especially in periods of business prosperity and high staffing growth. Therefore, credit availability for many typical suppliers from more traditional sources like commercial banks is often not workable, due to banking regulations. This is true even though many small to medium sized staffing vendors have customer lists full of highly credit worthy Fortune 500 clients.

The result of these factors is that many staffing suppliers are forced to do business with factoring companies charging very high effective interest rates. The factoring companies are costly because of processing duplications and inefficiencies, unsupported invoices, and perceived higher risk, this last despite quality credit worthiness of many staffing supplier clients being invoiced. Thus, the financial network subsystem 670 provides invoice information and supporting documentation to allow lenders to more easily, confidently, and less expensively finance invoices and easily monitor invoice activity of the suppliers associated with the orders.

The financial network subsystem 670 of the ICPR system, which is agreement based, authorizes access for lenders to staffing suppliers to all necessary data and lender specific reports to finance receivables and manage portfolios across multiple staffing supplier clients on an extremely streamlined basis. The staffing suppliers being financed receive real time data and reports regarding receivable status with their lenders.

More specifically, via the financial network subsystem 670, lenders will be able to access invoices that are fully supported by approved time cards in standardized formats and obtain reporting across all suppliers using the ICPR system. In this way, lenders are able to validate time card approvals, standardize information received from their multiple clients, streamline monitoring of and reporting on multiple clients' activities, and retain primary focus on underwriting issues and risk.

The financial network subsystem 670 of the ICPR system (along with connecting suppliers with lenders) dramatically addresses the needs of typical staffing suppliers and their lenders. The financial network subsystem 670 employs functionality from the ICPR system to gain standardization and efficiencies in time collection, time approval, and invoicing. In fact, it is the discipline of standardized order, time capture and time approval across multiple buyers that creates the cost savings and efficiencies otherwise lacking for lenders trying to serve multiple staffing suppliers. The financial network subsystem 670 specifically addresses the receivables' support, collection, and reporting. Additionally, the time card hours coupled with the order confirmation economics allows a buying firm to not only tag and report on hours but to expense the equivalent. A buyer can also accrue uninvoiced expenses in a given period. The financial network subsystem 670 allows buyers to take advantage of the aforementioned.

Figure 8:
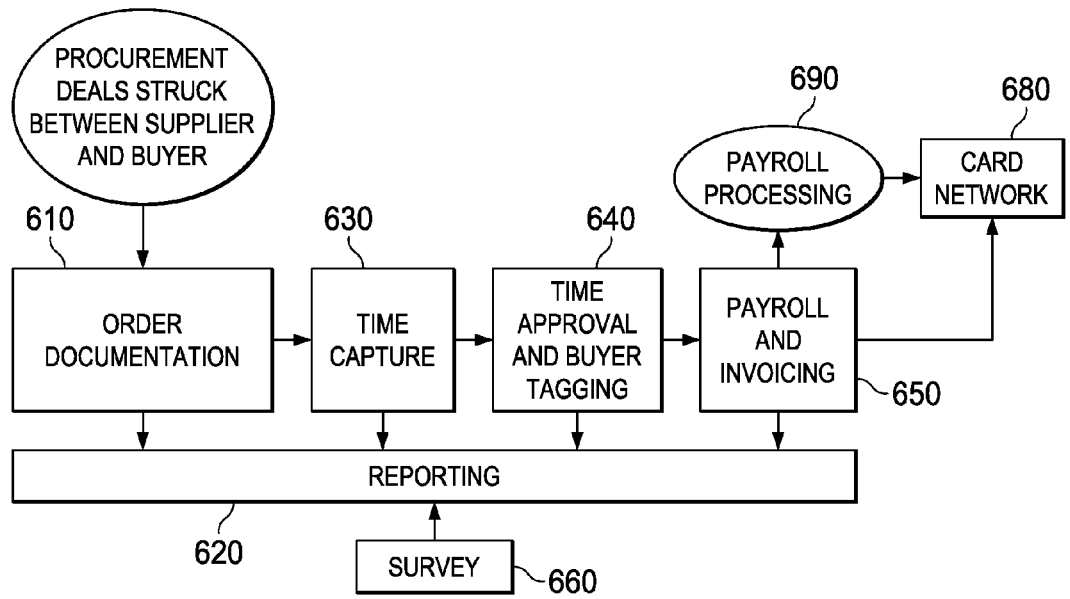
Figure 9:
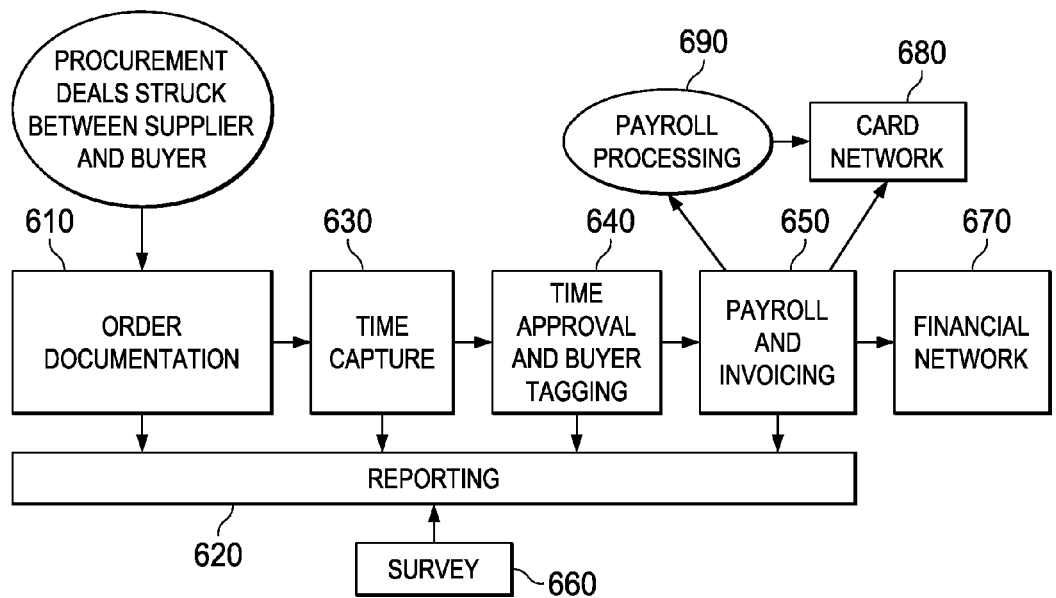

As illustrated in FIG. 8, the ICPR system includes a card network subsystem 680, which is an agreement based, authorized, nationwide use of pay cards for workers by suppliers. Because of the nature of staffing, most staffing suppliers, especially small-to-medium sized suppliers, have inefficient methods for paying workers. Traditional delivery systems for pay to workers are typically inadequate as evidenced by the client locations being dispersed, and many workers change locations to different clients or different client locations, making individual delivery of paychecks impractical. Workers often drive weekly to the staffing supplier's office to pick up paychecks (the workers may drive long distances, especially in the case of a staffing supplier in a large city). Workers also often lose paychecks and expect immediate replacement of lost paychecks (for pressing needs, like groceries). Thus, stop payment charges to the staffing supplier are high in proportion to check amounts. Additionally, the check cashing fees paid by workers are exorbitant; and workers can be literally be "off the payroll" before direct deposit procedures take effect.

The card network subsystem 680 allows workers and suppliers to both experience lowest cost and highest efficiency. A card can be used as a debit card or the worker, via web access, can transfer balances to other checking accounts, savings accounts, or 401(k) accounts. The paper paycheck issues such as check cashing fees and replacement check costs are eliminated. The standardization and documentation of time card approvals of the ICPR system are in response to the often numerous disputes in the staffing industry that result in sloppy and often undecipherable data on multiple thousands of weekly paper time cards.

Via the card network subsystem 680, workers can access current and historic payroll information via a secure login identification ("ID") and password. When accessing this information, the card network subsystem 680 provides key communications from the supplier and targeted advertising from outside advertisers. The card network subsystem 680 may also interface with a payroll processing system 690 to facilitate proper payment to the workers. In the embodiment illustrated in FIG. 9, the ICPR system includes the financial network subsystem 670 and the card network subsystem 680. Thus, the card network subsystem 680 generates pay card activity, integrates the pay card activity with a financial institution and provides reports to the workers and the suppliers associated with the orders. Having introduced the subsystems that form the ICPR system, exemplary screen shots will hereinafter be described to accentuate the features and functionality associated therewith.

Turning now to FIG. 10, a method of operating the ICPR system begins with documenting the terms of a particular staffing transaction between the buyer and the supplier in accordance with an order documentation subsystem as described above. The supplier enters the information, some of which is specific to the supplier and forms the basis of reporting information that is custom to the supplier (e.g., one or more tags such as selling location of the supplier, customer, job title). Also, the supplier may have previously created one or more templates for those orders that have all common characteristics (e.g., customer, bill rate) and use such templates as order wizards to save time and effort by documenting numerous orders in bulk (i.e., for workers doing the same work at the same rate for the same customer). The compounding of this information creates a nearly infinite number and variety of data that the supplier can mine to enhance customer service and drive operational efficiencies. At the same time, certain of the entered ordered information is shared between the buyer and supplier (e.g., bill rate), as well as the worker (e.g., planned work start date). The buyer and supplier use such information in concert with other data to forge reporting customized to various needs. The aforementioned process can be accomplished across multiple buyers, multiple suppliers, and multiple workers, respectively. FIG. 10 is a final screen summarizing some of the key information entered in the previous steps of an order from a supplier view, the general categories of which are enumerated in the steps at the top of the screen.

Turning now to FIG. 11, the buyer and other parties selected by the supplier are automatically emailed the order transaction data. Because such transaction information is often not affirmed between the supplier and the buyer in the normal course of doing business, this action works to eliminate many disputes that arise later (e.g., after invoicing). Thus, FIG. 11 illustrates an order confirmation via email in accordance with the order documentation subsystem as described above from a buyer's view.

Turning now to FIG. 12, the worker submit time entry (option 1 of a time capture subsystem as described above with respect to FIG. 3) allows a worker to enter time for any particular buyer, any particular week, from any browser, anywhere. The worker may save the entry multiple times, return to edit it and then, finally, send it to the appropriate buyer approver. The note section allows special communication of importance to the buyer approver. FIG. 12 illustrates a view from the worker's perspective.

Turning now to FIGS. 13 and 14, a buyer submit roster time entry (option 2 of the time capture subsystem as described above with respect to FIG. 3) allows the buyer supervisor to select workers and enter (and manage) the time worked by those multiple workers (see FIG. 14). Sometimes it is not desirable or efficient of the worker to enter his or her own time and for the buyer approver to have to wait until the week is complete to understand the time being worked by the various workers (the hours and comments may be stored multiple times throughout the week). The wizards allow buyer supervisors to enter hours or comments across multiple workers with one click. Using this roster, the buyer supervisor can control overtime that the buyer may be contractually obligated to pay the supplier of the worker. The buyer supervisor may also submit the time cards from this roster in batches. FIGS. 13 and 14, therefore, illustrate the buyer submit roster time entry from the buyer's view.

Figure 15:
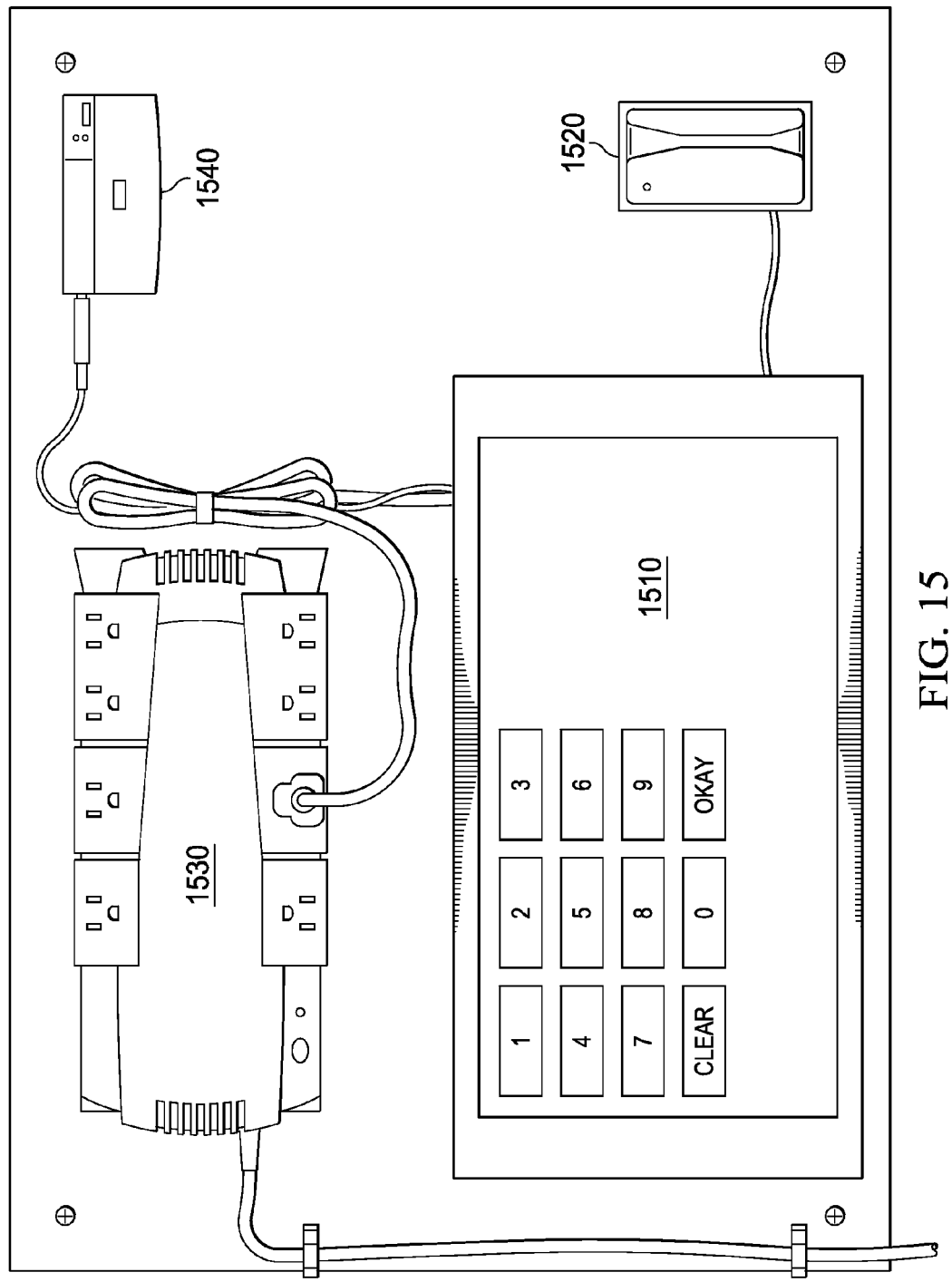

Turning now to FIG. 15, the buyer may use a time clock for multiple suppliers at once (option 3 of the time capture subsystem as described above with respect to FIG. 3). Using this one time clock (a universal time clock), the ICPR system serves all suppliers on that time clock as opposed to the traditional approach wherein each supplier has a dedicated time clock. The worker swipes badge printed by supplier via the ICPR system or the workers may enter a nine digit ID (e.g., social security number). Further, if so configured by the buyer, the worker may make selections about his time worked that provide the buyer tagging data upon buyer approval of time. The supplier can easily imprint each worker's picture on each badge for identification and security purposes. The same photographs may be reviewed by each supplier and each buyer associated with the transaction via web access in various reports throughout the ICPR system. The time clock includes a display 1510, card swipe 1520, a backup battery 1530, and communication interface 1540 (via, for instance, the internet).

Turning now to FIG. 16 and in accordance with the universal time clock, buyer personnel may select a worker's time card for detailed review or editing by clicking an "edit" button in accordance with the time capture subsystem. As illustrated in the buyer's view, the buyer personnel may click on an "info" button for detailed order information and also terminate the order whereupon the ICPR system will automatically notify the supplier involved in the order.

Turning now to FIG. 17, buyer personnel may drill down even further to review specific times that the universal time clock has captured for each particular worker in accordance with the time capture subsystem. As illustrated in the buyer's view, the worker may have multiple entries each day for breaks, lunch, etc. and, if so, the display merely expands to reflect the full set of time inputs for each day.

Turning now to FIG. 18 and in accordance with the universal time clock, buyer personnel may select a line to edit with the time capture subsystem. As illustrated in the buyer's view, the buyer then merely adjusts the time (hours, minutes, am/pm) as needed. The ICPR system adjusts the line for the new time entered when the buyer clicks an "update" button. However, if the buyer attempts to enter a new time that overlaps with an existing time entry (e.g., if 12:15 pm is entered in place of 11:00 am), the ICPR system will not allow completion of the edit.

Turning now to FIG. 19, buyer personnel may create an entire new line of time for a particular day with the time capture subsystem. As illustrated in the buyer's view, the buyer clicks an "add entry" button to enter a new time block for a selected day. The new time for a line is adjusted in the ICPR system when the buyer clicks an "add" button. However, if the buyer attempts to enter a new time block that overlaps with an existing time entry (e.g., if 11:05 am is entered in place of 11:00 am here), the ICPR system will not allow completion thereof. The ICPR system also handles a series of special issues that arise in the normal course of work, such as a worker forgetting to clock out.

Figure 20:
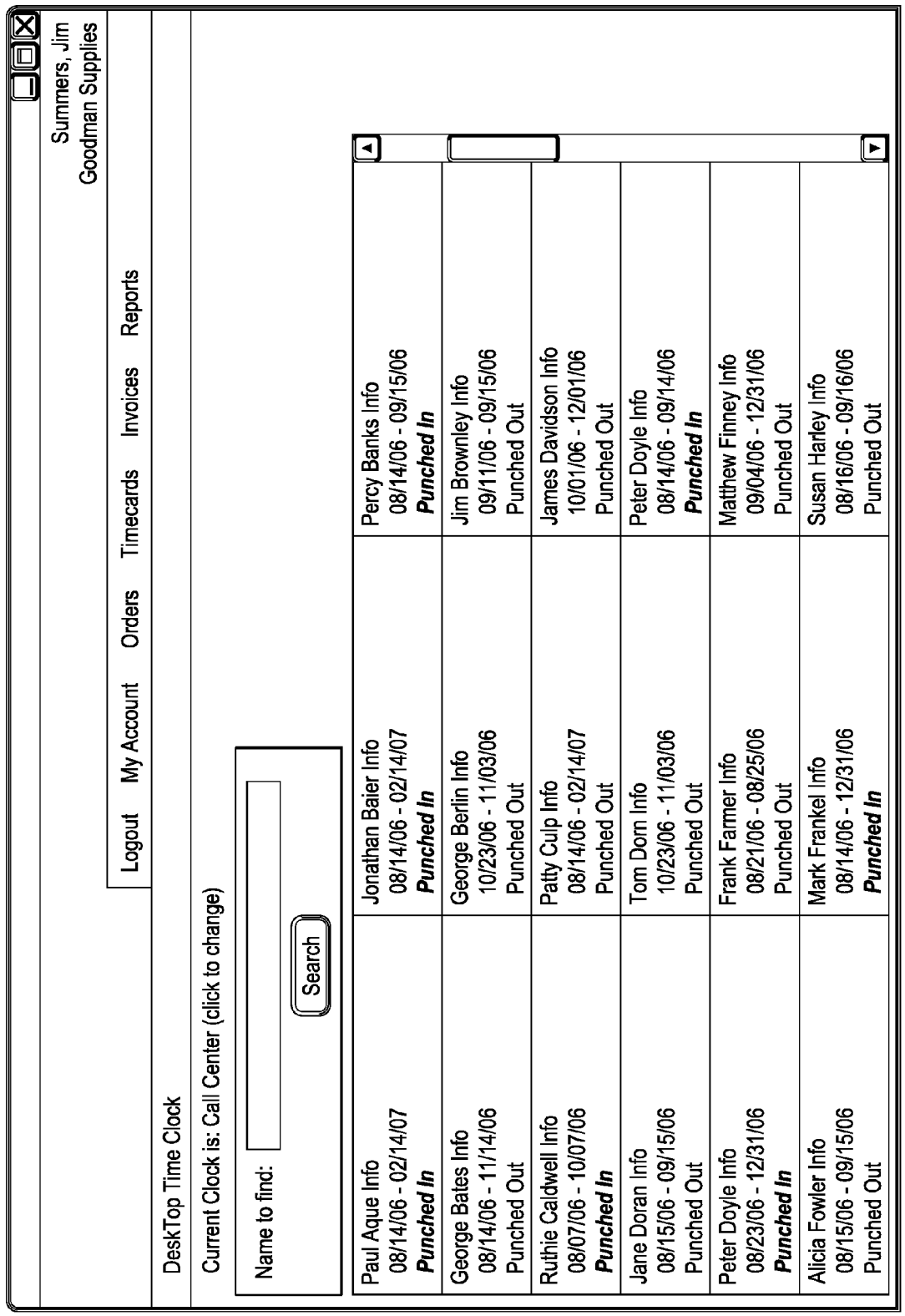

Turning now to FIG. 20 illustrating a buyer view, various buyer personnel at multiple locations may select from a menu of workers that are mobile to work multiple locations and the buyer personnel selects each individual worker to control time once the worker arrives (option 4 of the time capture subsystem as described above with respect to FIG. 3). The buyer personnel may review, edit, or submit time for the worker for the week selected as illustrated in the buyer view of FIG. 21.

Figure 22:
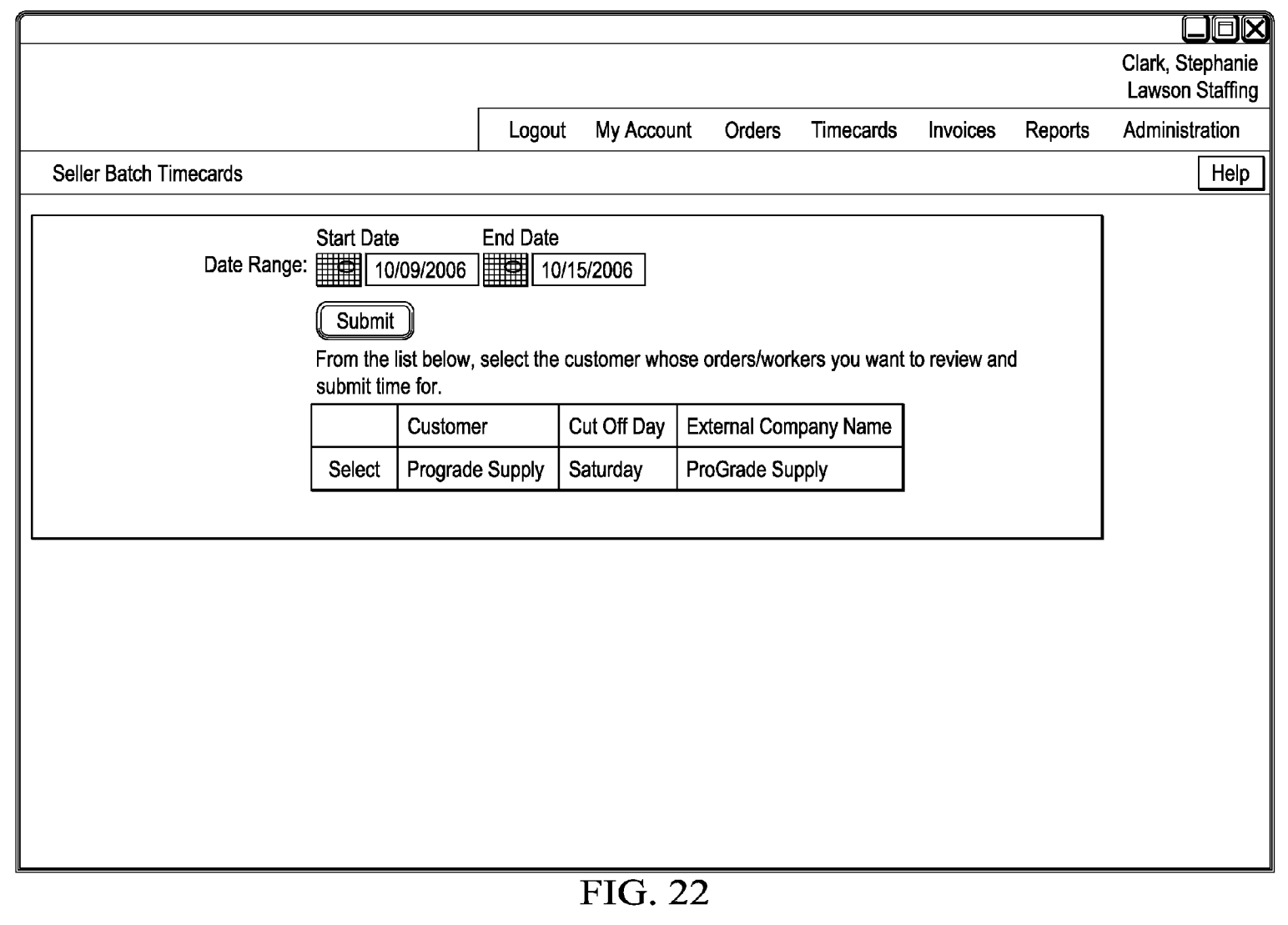
Figure 24:
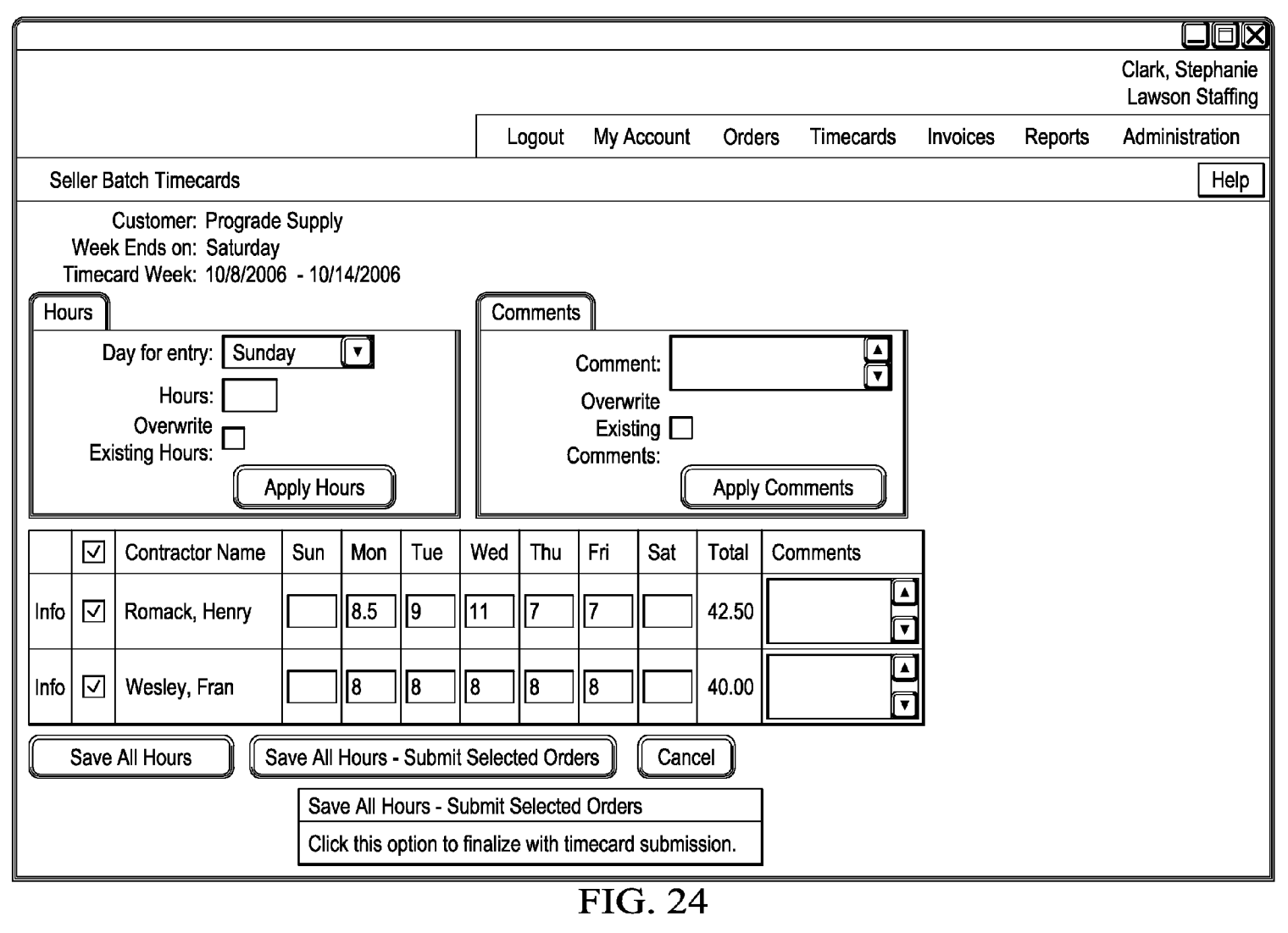

Turning now to FIGS. 22 to 25 illustrating supplier views, supplier personnel may elect to enter time on behalf of the worker (option 5 of time capture subsystem as described above with respect to FIG. 3). The supplier selects the date range and the buyer customer desired. (FIG. 22). In accordance with FIG. 23, the supplier personnel select the workers to enter time for. In accordance with FIG. 24, the supplier personnel enter, save, or edit the time for the workers selected and then submit the time. In accordance with FIG. 25, the supplier personnel send the time card(s) to the email address of the buyer approver.

Figure 26:
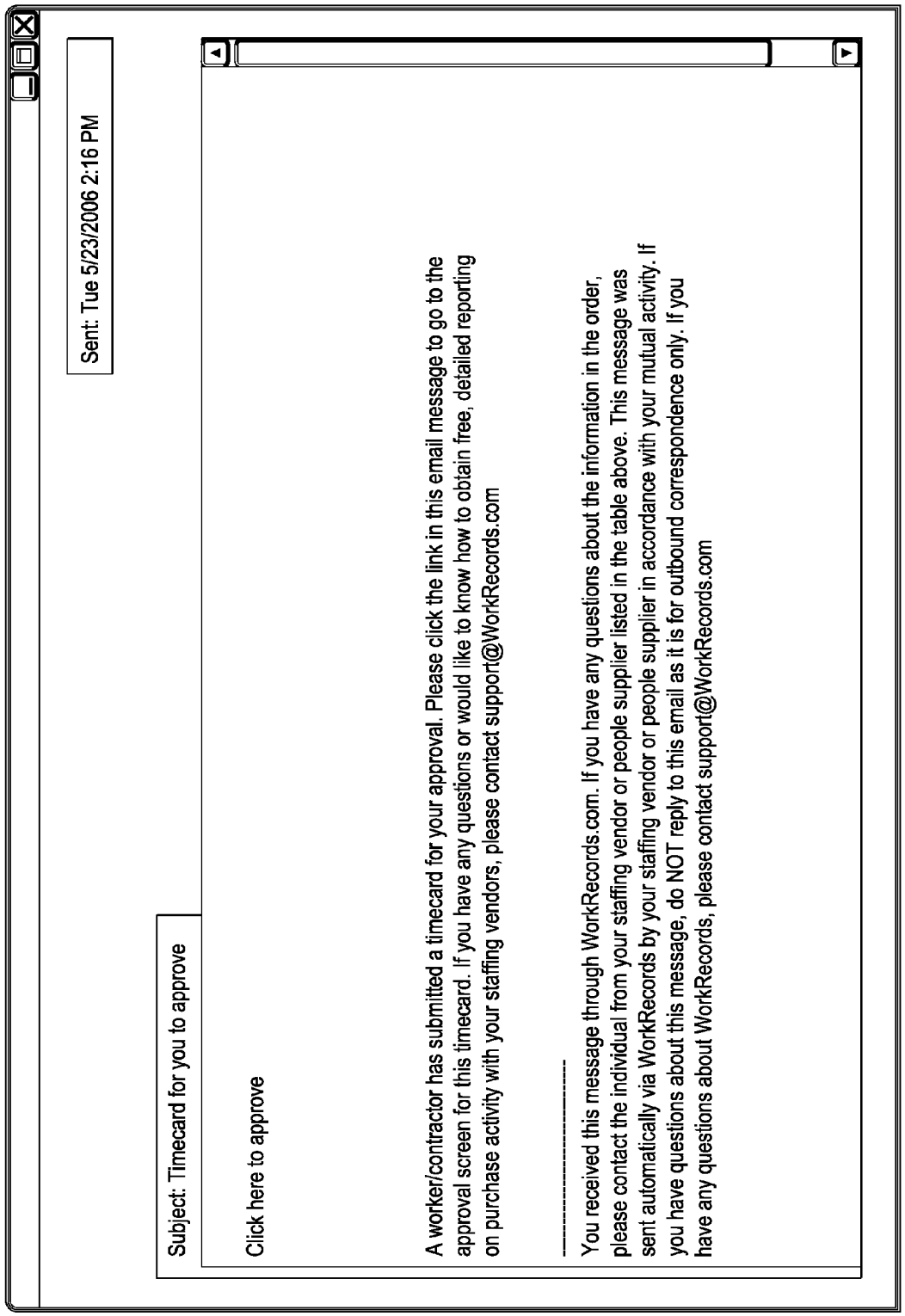

Turning now to FIG. 26 illustrating a buyer view, the buyer approver receives an email notice in an assigned corporate email as part of the time approval and buyer tagging subsystem in accordance with a worker submit time capture. When the buyer approver clicks on the link, the ICPR time is immediately accessed without the buyer approver having to log in to the ICPR system. This approval may have been sent through more than one time capture subsystem approach (e.g., worker submit, supplier submit).

Turning now to FIG. 27 illustrating a buyer view, the buyer approver can approve or reject the time card in accordance with a worker submit time capture. If rejected, the worker automatically receives an email notification and, operating under the instructions or feedback from the buyer approver as documented in a "reason" box, can then edit and resubmit the time card for approval. The majority of time card approvals by most buyers that a supplier serves can be handled with this simple process in FIG. 26 and 27. The buyer approver simply clicks twice, namely, first on a "click here to approve" button and then on an "approve" button. In this fashion, the order's receiver, the time card approval, is done week after week and each invoice is fully supported by a combination of the financial terms of the order and hours volume from the approved time card.

Figure 29:
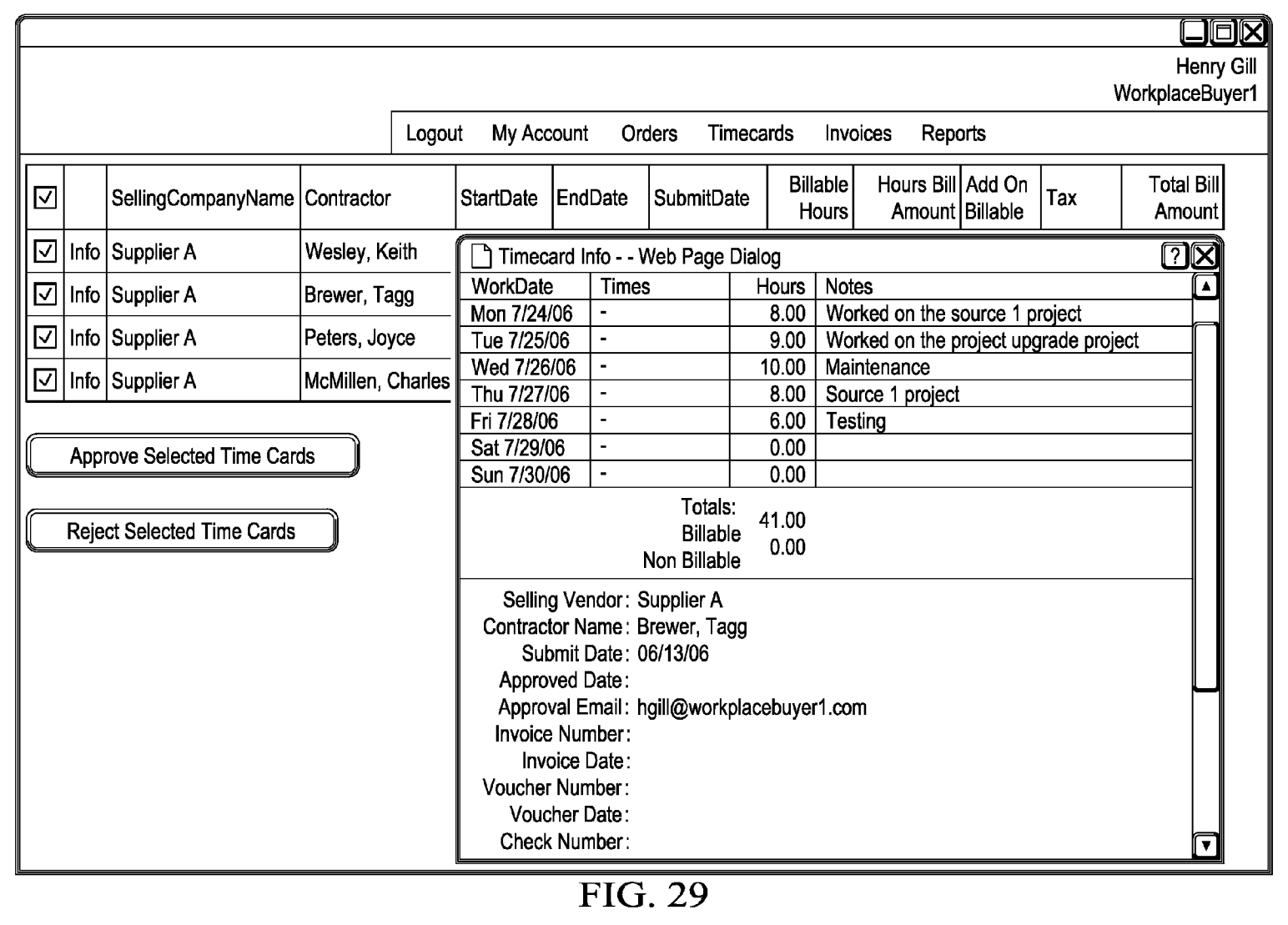

Turning now to FIG. 28 illustrating a buyer view, as an alternative to approving time cards by clicking through an email notification, the buyer approver may elect to approve time cards through access via an ICPR menu in accordance with a worker submit time capture. The buyer approver clicks on an "approve waiting time cards" button and brings up all unapproved time cards directed to an email address. The supervisor can then select any time card(s) to approve (or reject and send back to the worker, if desired). As illustrated in FIG. 29, to assist in the process of approving time cards, the buyer approver can review all details of any time card by clicking on an "info" button for that time card in accordance with a worker submit time capture.

Turning now to FIG. 30 illustrating a buyer view, once the time is approved for a worker, the buyer approver is automatically brought to an ICPR custom tagging screen in accordance with the time approval and buyer tagging subsystem.

The buyer approver now tags the hours with buyer specific labels (e.g., one or more tags such as location, department, expense code). The hours can be parsed into different tagging groups multiple times. Some time tracking approaches simply allocate labels for a worker according to where the worker is expected to work and what the worker is expected to do. The ICPR system allows the buyer approver to allocate in numerous combinations of label categories what the worker actually did that week and where the worker actually did it. This is advantageous since actual workplace activities rarely conform to plans.

The ICPR custom tagging and its versatile menu for tagging is available for every buyer approver at the buyer company, no matter what the profile of worker (e.g., industrial, technological, clerical), no matter the location, no matter the job activity, no matter the supplier. In this way, the buyer firm may get inherently consistent, robust data and reporting in the buyer firm's own internal "language" while not being restricted in any fashion in choice of worker profiles, locations, number and type of suppliers used, etc.

Turning now to FIG. 31 illustrating a buyer's view, the buyer approver who is approving a number of workers simultaneously (e.g., where the workers did exactly the same tasks at the same plant location) may tag multiple workers simultaneously in accordance with, for instance, a buyer submit roster or time clock submit time capture. In this functionality, since the buyer approver is tagging for a group rather than an individual, the buyer approver allocates percentages of the time rather than allocating partial hours.

Turning now to FIG. 32 illustrating a buyer view, the buyer approver is allocating 75% of the 8 workers' time to "distribution logistics phase 1" and 25% of their time to "distribution logistics phase 2," even while 100% of their time is at the "Florida plant" location, in the "production" accounting code, and fulfilling the "assembler" job title in accordance with, for instance, a buyer submit roster or time clock submit time capture. In this fashion, the buyer approver may easily tag in bulk (across multiple workers), immediately following the approving of the time itself in bulk across the eight workers.

Turning now to FIG. 33 illustrating a supplier view, the supplier may easily invoice using the payroll and invoicing subsystem. First, the supplier selects the buyer to invoice. The supplier then selects time cards and enters the invoice number and invoice data as illustrated in FIG. 34. Time cards may be selected in bulk for invoicing together, either by selecting them one at a time, by checking the box in the far left column to designate their individual inclusion, or by selecting all time cards displayed in bulk, by checking the box at the top of the far left column. The "selected total" tallies the total amount of billings for the time card selected and changes each time that time cards are selected or deselected. In this way, the supplier may control the total billing amount on any particular invoice.

Once the supplier has clicked the "create invoice" button, because the ICPR system is a shared system between suppliers and buyers, an invoice is created by the ICPR system and is immediately available to the buyer. Further, all information supporting the invoice (order data such as bill rate, time card data such as hours worked) is included with the invoice. This real time, paperless, shared system approach has enormous ramifications for the efficiency of buyer and supplier operations. For instance, the buyer's accounts payable personnel may review and remit funds for an invoice completely supported by approved time cards just moments after the approval of the time by buyer operations personnel, assuming that supplier personnel has taken the few seconds to create an invoice comprised of those time cards. This can be done by the buyer's accounts payable personnel for every supplier. Exemplary invoices in accordance with the reporting subsystem will described below.

Turning now to FIG. 35 illustrating a supplier view, in the staffing industry, the same order and time card data that supported the invoice naturally supports the payroll information needed for the worker. In the ICPR system, this includes the payroll and invoicing subsystem. The supplier first selects the date range to be covered for payroll and then selects the "export type," depending upon which payroll application the supplier is using. The ICPR system has the capability to create the necessary data files and formatting for any payroll applications that upload data for payroll processing.

Figure 36:
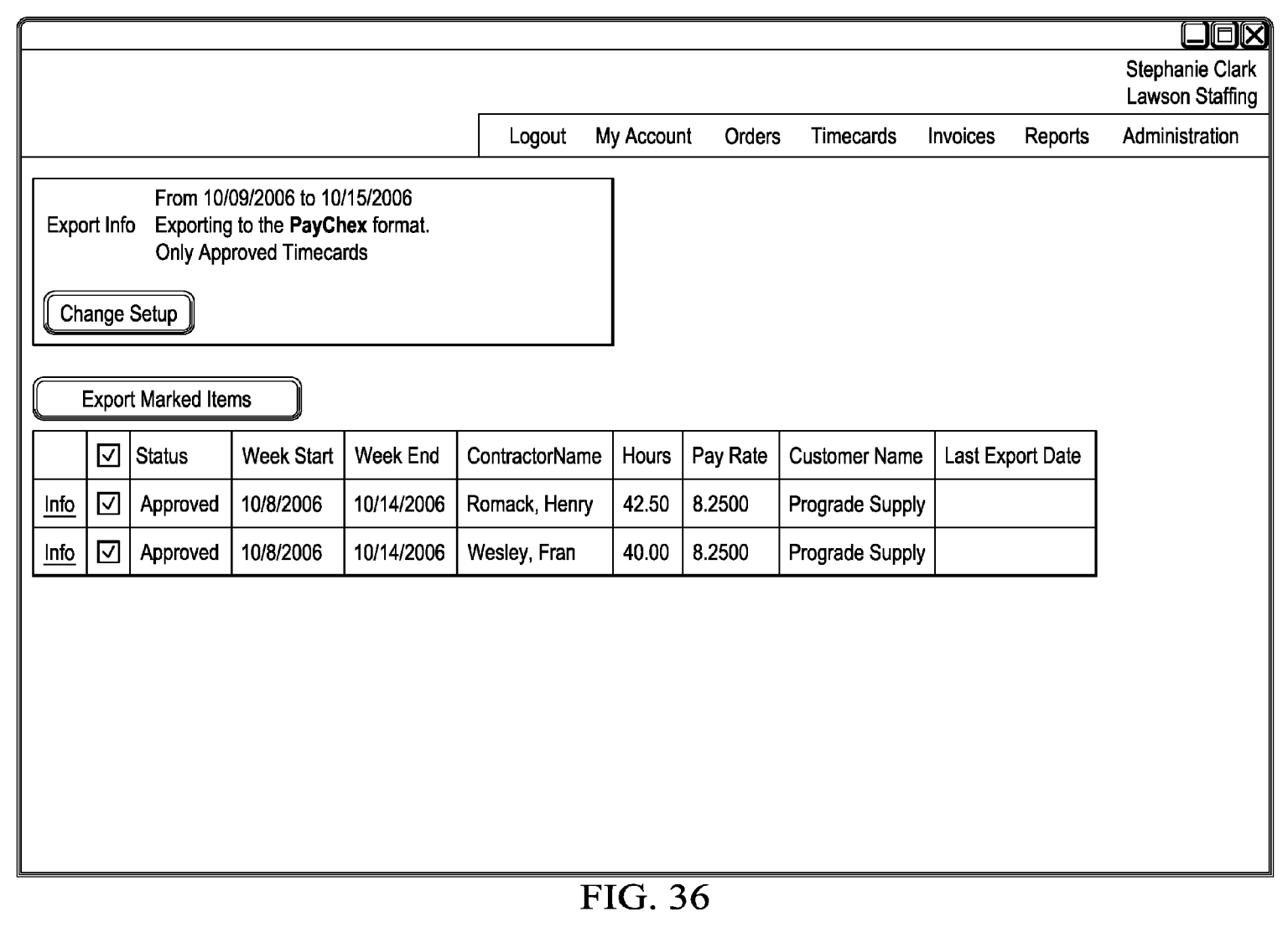

Turning now to FIG. 36 illustrating a supplier view, the supplier selects the workers to include in the payroll export. The workers may be selected in bulk by selecting the box at the top of the column. The supplier may review and research any particular time card information for any particular worker by selecting the "info" button for that worker as illustrated in FIG. 37.

Figure 38:

Turning now to FIG. 38 illustrating a supplier view, the supplier now clicks an "export marked items" button to create a file that will be used to upload the necessary formatted information into the payroll application. Using these steps, in a matter of seconds, the supplier may have a file containing thousands of workers ready to upload into payroll. Further, these hours have been supported by approvals by the buyer approvers representing multiple buyers. Paper time cards are not just inefficient; many disputes about validity of signatories, blurred handwriting, and unreadable hours written down by hand are resolved by the design of the ICPR system in accordance with the payroll and invoicing subsystem.

Turning now to FIG. 39 illustrating a buyer view, the buyer can assess its suppliers by using the survey subsystem. The ICPR system can accommodate an exit survey that assesses both the worker and supplier via a "point and click" process (after the assignment is ended). The ICPR system can also accommodate a fill survey (not shown) that buyer personnel complete just after the assignment is filled. These two surveys are separate because the buyer needs to complete the fill survey while the fill and worker orientation information and his related observations are fresh (i.e., it may be months before the assignment is completed and the exit survey is ready to be completed). The ICPR shared system approach (across multiple buyers and multiple suppliers simultaneously) is important to the design and effectiveness of assessment. Inasmuch as the questions are consistent across multiple suppliers, the compiled results allow the buyers to compare and contrast results across suppliers. Likewise, suppliers may obtain results from buyers and compare and contrast results.

Turning now to FIG. 40 illustrating a buyer view, the buyer may access the automatically compiled fill survey report by worker order. The buyer may also access the fill survey report by supplier (not shown), and compare and contrast the supplier with regard to both specific questions and averages across the questions and data sampled. The buyer may access the automatically compiled exit surveys using various query parameters as illustrated in FIG. 41.

Turning now to FIG. 42 illustrating a supplier view, an order report selector criteria screen provides a glimpse into the reporting subsystem that serves both suppliers and buyers. The reporting subsystem's capabilities are literally almost infinite. Each supplier has customized reporting capabilities specific to that supplier; one set of selectors are specifically their custom data (e.g., selling locations). The supplier may select one or more of those custom selectors. At the same time, the supplier may select one or more of the ICPR system selectors that pertain to this type of report, in this case, "estimated hours" or "pay rate" or "bill rate." Further, each of those selectors may have further definition such as estimated hours "between 35 and 45" or contractor name contains "Smith." The possibilities are literally endless and are customized specific to this supplier across any and all the supplier's buyers.

Turning now to FIG. 43, illustrated is the result from the query of FIG. 42. Seventy five items were returned that met the criteria selected. The supplier may peruse the report at will and research each returned item further by clicking on the "info" button. The supplier may access this information in about three to five seconds from any browser. The supplier may reaccess this information at any time by simply requesting the same selectors. In addition, by clicking "export," the supplier can export all this data to a spreadsheet in order to save the data to a local hard drive and manipulate this data further. The supplier has exported the data from FIG. 43 as illustrated in FIG. 44.

Turning now to FIG. 45 illustrating a supplier view, the supplier using the reporting subsystem wants to determine what orders lack time cards being submitted for a particular selected week for a particular geographic area. As illustrated in FIG. 46, the supplier finds that, in response to the criteria selected in FIG. 45, three time cards have not been submitted. Now, the supplier has specifically identified exactly where to focus efforts to obtain all the time cards necessary to pay workers and invoice customers this week. This report represents a radical departure in practice and efficiency of the typical staffing vendor. Mondays are legendary in the staffing industry, as suppliers scramble to find the status of time cards, namely, have they been completed, are they in the hands of approvers, are they in transit, are they in dispute, is the buyer's approval legible, can you read them if and when they get here. The ICPR system combination of functionality and linked steps creates a seamless process such as the order entry, then the time capture, then the time card approval, and then this report easily ascertaining the status of time cards across every supplier location, every buyer, and every worker in a matter of seconds. Of course, the supplier then follows up on these exceptions; once resolved, the supplier is ready to seamlessly execute the payroll and invoicing subsystem.

Figure 47:
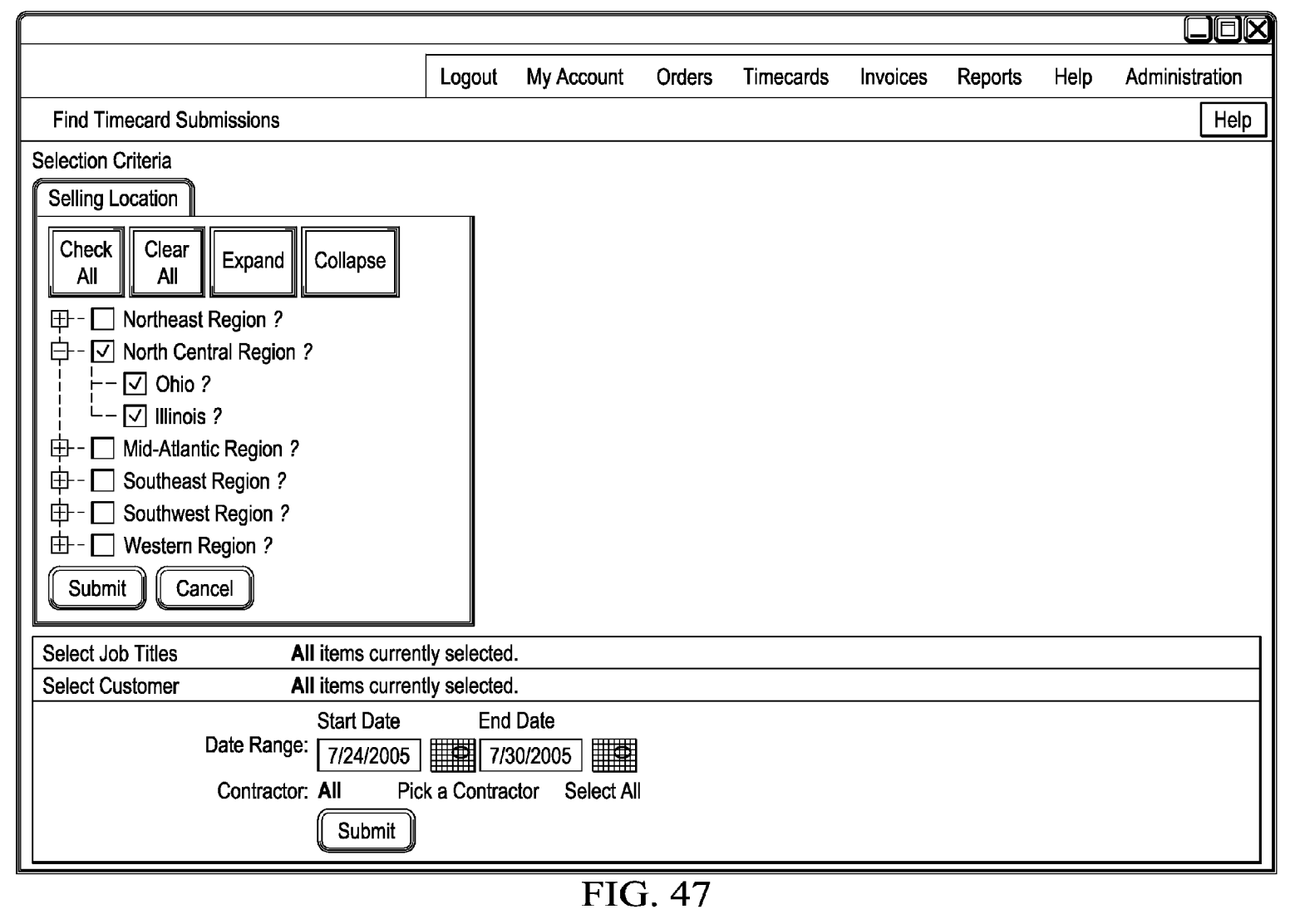
Figure 48:
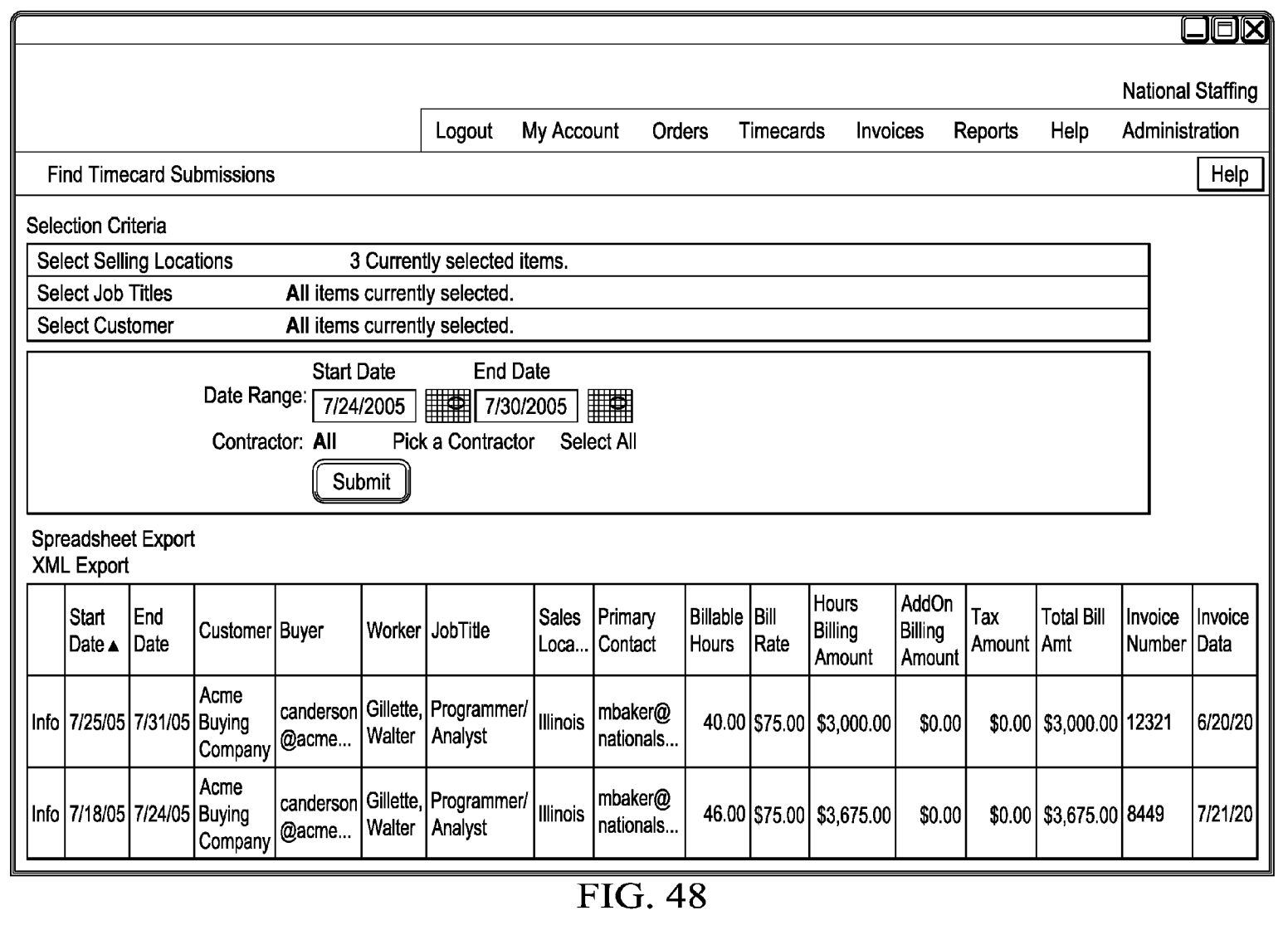

Turning now to FIG. 47 illustrating a supplier view, the supplier may want to review the approved time card activity for a group of custom selection criteria (e.g., here, the supplier wants to know what time cards are submitted and approved for the North Central Region for all customers for all job titles for the week of July 24 through July 30). The supplier may review the results of the query within seconds as illustrated in FIG. 48.

Again, the supplier may research each item by clicking on the "info" button. It is important to note that FIGS. 42 to 48 are only representative of the suppliers' access to reporting in the reporting subsystem. Suppliers may access all types of reports relating to orders, time cards, invoices, buyer customers, workers, and operations. Each of these reports has different types of selection criteria and selectors appropriate to the particular report; some selection criteria are custom to the supplier and others are ICPR standard selectors germane to that particular report. In this fashion, because of the functionality and discipline created by the subsystems of the ICPR system feeding into the reporting subsystem, various supplier personnel are able to creatively access a nearly infinite, individually customized array of report variations, within seconds, from any browser, anytime, anywhere.

Turning now to FIG. 49 illustrating a buyer view, the buyer has similar robust opportunities to use the reporting subsystem. First, the buyer selects the desired date range for the report. Second, the buyer selects the "tagging tree detail" for a report. This detail comes directly from the custom tags configured for the buyer company. Third, the buyer selects specific queries from "field selectors" such as bill rate, overtime factor, etc. In this example, the "narrowed" or "filtered" selection (1) covers Oct. 1, 2005 to Dec. 31, 2005; (2) is for the Phoenix Plant only; and (3) is for all suppliers but only for bill rates between $10 and $15 and overtime hours greater than zero for each of the weeks in the date range selected.

The buyer reviews the result in a matter of seconds as illustrated in FIG. 50. Many columns in the ICPR reports have a hover feature; when the buyer hovers over the icon, appropriate statistics for the column appear (e.g., totals, averages, minimum observation, maximum observation). This allows the reviewer to gain a sense of the data without having to scroll down the entire report; because the report can literally contains thousands of returned items on the list (here, there are 39), this feature is very useful to the reviewer. The buyer may also export data to a local spreadsheet as illustrated in FIG. 51.

Figure 52:
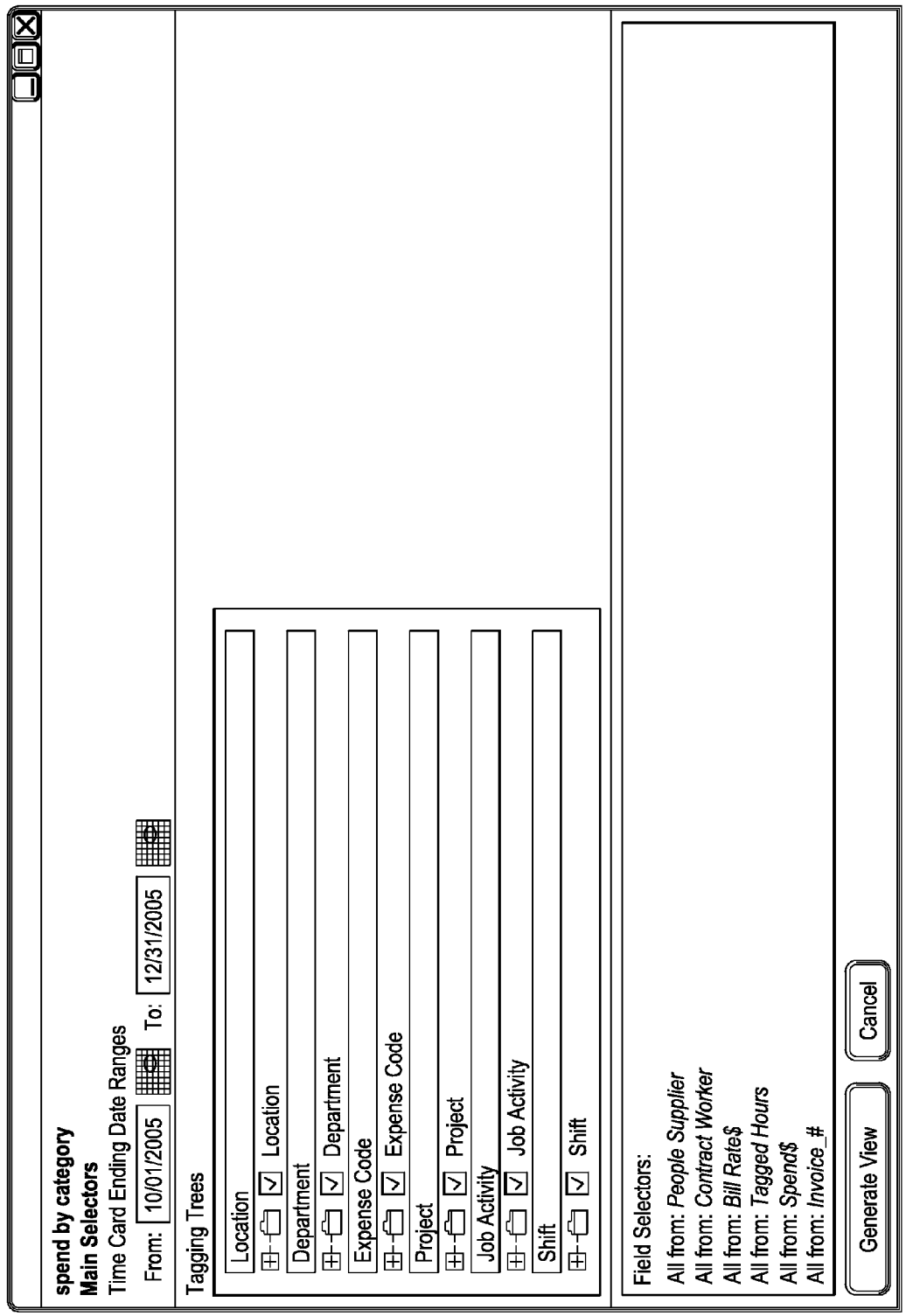

Turning now to FIG. 52 illustrating a buyer view, the buyer may generate a spend report utilizing the usual custom and standard selection criteria in the ICPR system. This report detailing the actual spending on workers by the buyer (and its related report, the accrual report) has become even more important to buyers with the advent of Sarbanes Oxley and other regulatory requirements. Spending on staffing can often include many companies' single largest expenditure without a purchase order due to the flexible nature of hours worked each week, and unclear expected durations of the assignments defeat the effectiveness of a typical purchase order system.

With the ICPR system order and time card functionality, the buyer can first ensure that all open orders have completed time cards as of a fiscal quarter or fiscal year end and, second, quantify the liability to the entire group of suppliers. The buyer needs a quality "purchase order and receiver" system to ascertain liability or spend that invoices must later match to, especially because many staffing suppliers do not have sophisticated invoicing. The ICPR system provides the aforementioned capability. The buyer with a December 31 year end may ensure that all orders do not have any missing time cards (by, say, January 2) and then, in seconds, generate a spend or accrual report that accurately calculates the liability that the individual buyer approvers have collectively agreed to on behalf of the buyer company. The buyer need not wait on invoices to be received to determine spend or liability.

Turning now to FIG. 53 illustrating a buyer view, the buyer can review the results of the 493 items returned. After reviewing the detail, the reviewer can decide to change or narrow the selection criteria by clicking the "change" option. As illustrated in FIG. 54, the buyer can review a summary breakdown of results from the previous report on FIG. 53 (e.g., of the 493 items returned in FIG. 53, the Stockton Plant appeared in 17 items and shift 2 appeared in 108 items). The buyer can then reselect criteria based on the new insights gained and then generate a new report.

Turning now to FIG. 55 illustrating a buyer view, the buyer can review the new. report with eight items returned (relating to shift 2 at the Stockton Plant as selected on FIG. 54). This enabling "change" feature is available on many ICPR reports. With the ability to generate and regenerate new reports in seconds, each of which responds to the custom tagging across multiple suppliers, the ability of a buyer to truly drive excellence in usage of contract workers from the staffing industry is unique.

Figure 57:

Turning now to FIG. 56 illustrating a buyer view, the buyer can generate a report regarding suppliers' invoices in the reporting subsystem. The selection criteria allow the buyer to narrow the search. The buyer can also see that four invoices met the criteria as illustrated in FIG. 57. The buyer may click the "info" button to review an invoice more deeply.

Figure 58:
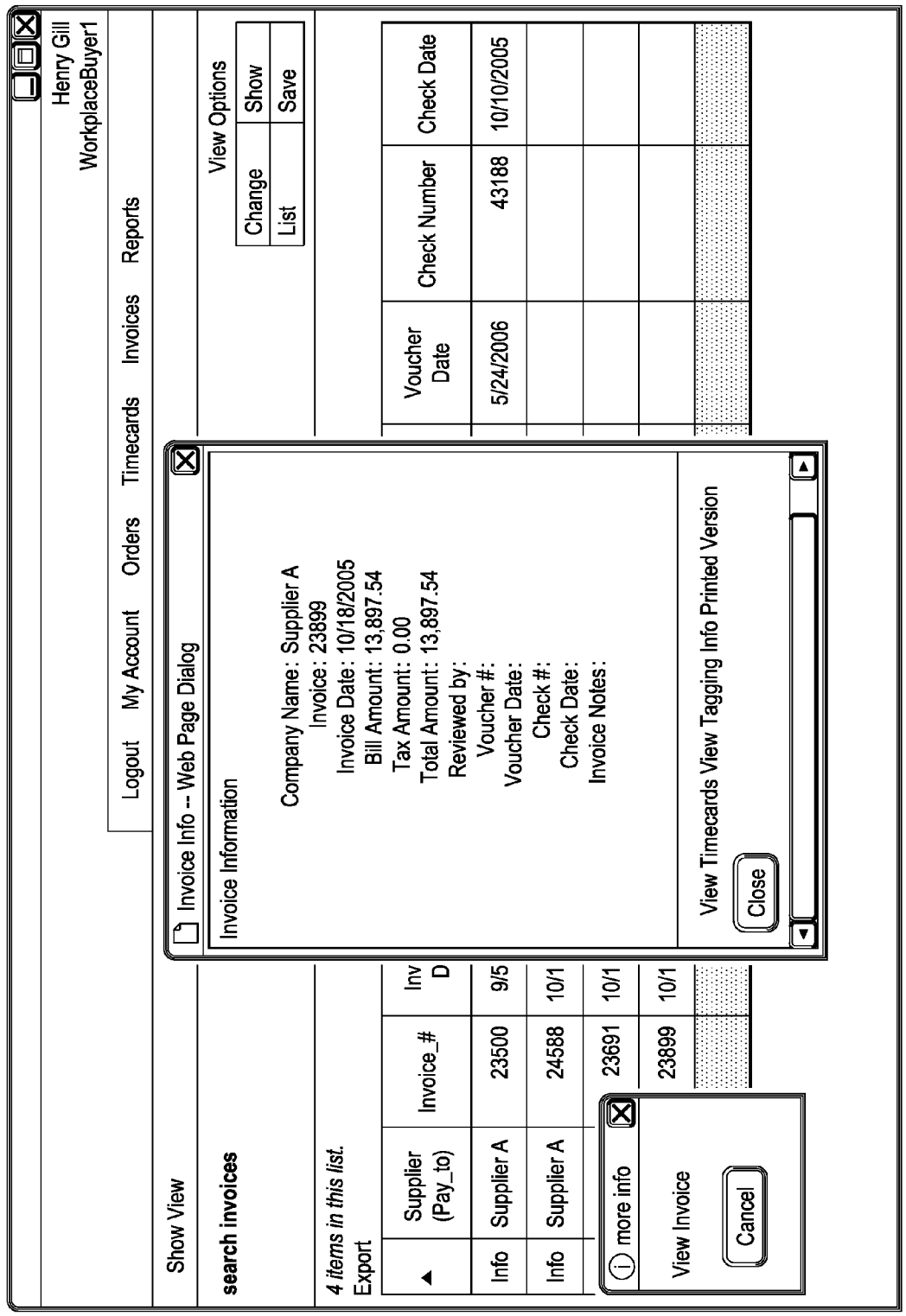

Turning now to FIG. 58 illustrating a buyer view, the buyer has clicked the "info" button to review summary information about that particular invoice. By clicking one of the links in the summary information, the buyer can obtain even more information: time cards supporting the invoice, the tagging for the time billed in the invoice, or a copy of the invoice itself. As illustrated in FIG. 59, the buyer can review the result from having clicked "printed version" on FIG. 58. Note the tagging of locations and expense (accounting) codes to assist the accounts payable department. This invoice copy means that a buyer firm can now print duplicate copies of invoices or even go paperless. The buyer can now get all invoices for staffing from multiple suppliers using the same invoice format and consistent tagging for expense codes, etc. Without the ICPR tagging and detailed time card support, the accounts payable clerks typically pursue operation personnel to ascertain nature, allocation, and even validity of the expenditure.

Turning now to FIG. 60 illustrating a buyer view, buyer personnel have multiple options for obtaining different levels of detail for invoices such as "invoices only," with summary information plus time card support and tagging information, "invoices with time cards," which also provides all the detailed hours for each time card, "invoices with time cards and order summary," which includes the order information as well, "invoices with time cards, order summary, and accounting info," which provides the necessary accounting information included in tagging, like the buyer's custom accounting codes.

Like suppliers, buyers using the ICPR system may access all types of reports relating to orders, time cards, invoices, suppliers, workers, and operations. Each of these reports has different types of selection criteria and selectors appropriate to the particular report; some selection criteria are custom to the supplier and others are ICPR standard selectors germane to that particular report. In this fashion, because of the functionality and discipline created by the subsystems of the ICPR system feeding into the reporting subsystem, various buyer personnel are able to creatively access a nearly infinite, individually customized array of report variations, within seconds, from any browser, anytime, anywhere.

Figure 61:
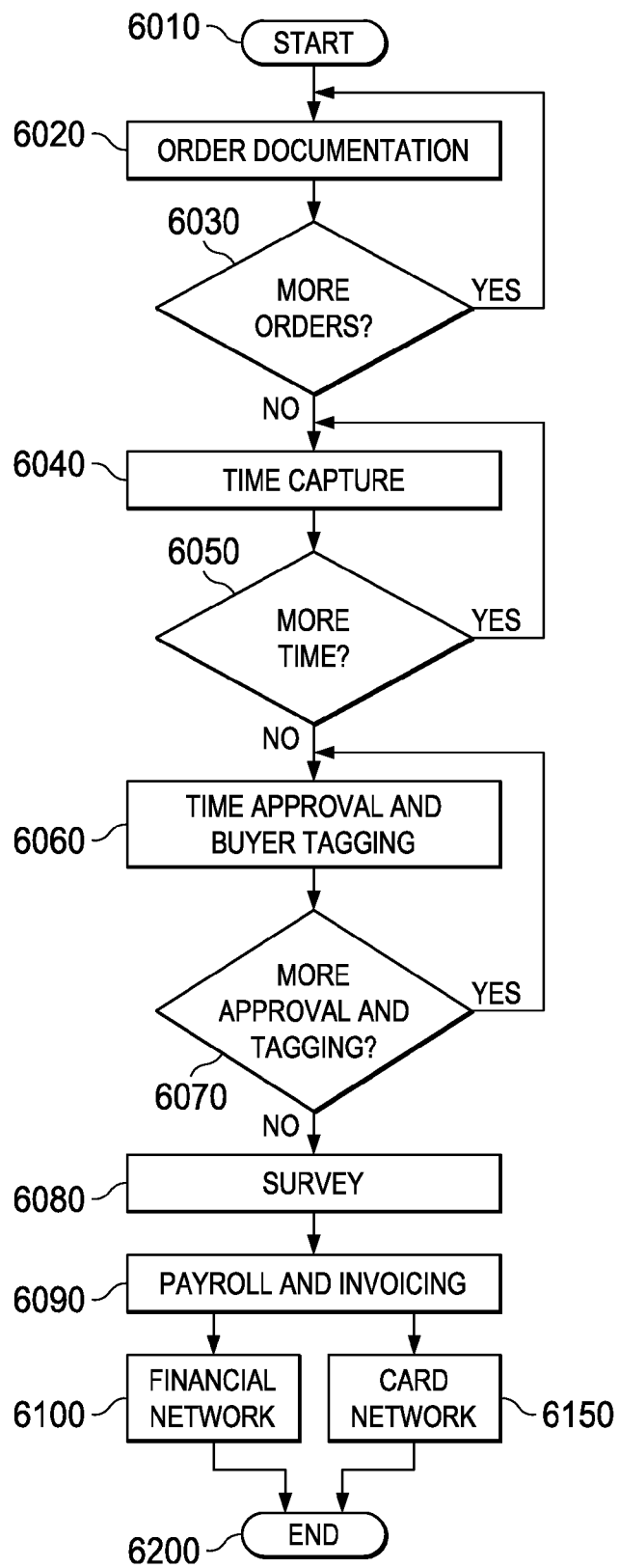
FIG. 61 illustrates a flow diagram of an embodiment of a method of operating an ICPR system according to the principles of the present invention.

Turning now to FIG. 61, illustrated is a flow diagram of an embodiment of a method of operating an ICPR system shared by multiple buyers, multiple suppliers and multiple workers concurrently according to the principles of the present invention. The method proceeds via a start step 6010 and then continues to an order documentation step 6020. In the order documentation step 6020, the orders for the suppliers and the buyers with respect to the workers are documented (e.g., input and saved in a personal computer). In other words, the orders document the procurement deals between the suppliers and the buyers. The suppliers also label the orders associated with time of the workers corresponding thereto with one or more tags, thereby translating the time of the workers into custom, internal terminology of the suppliers. Each of the orders may also specify a different method of time capture for the workers assigned thereto.

If there are more orders to document, the method returns to the order documentation step 6020 via a more orders decisional step 6030, otherwise, the method continues to a time capture step 6040. During the time capture step 6040, the method captures time by receiving time worked by the workers of the suppliers, which may include different methods of time capture from the workers positioned in one of anchored and untethered locations assigned to the orders. If there is more time to capture, the method returns to the time capture step 6040 via a more time decisional step 6050, otherwise, the method continues to a time approval and buyer tagging step 6060.

During the time approval and buyer tagging step 6060, the buyers approve and label the time worked by the workers corresponding to the buyers with one or more tags, thereby translating approved time of the workers into custom, internal terminology of the buyers. If there is more time to approve and tag, the method returns to the time approval and buyer tagging step 6060 via a more time to approve and tagging decisional step 6070, otherwise, the method continues to a survey step 6080. During the survey step 6080, the ICPR system captures survey answers by the buyers regarding the orders and, concurrently, the method continues to a payroll and invoicing step 6090.

During the payroll and invoicing step 6090, the method provides payroll information about the workers for the suppliers to pay the workers for the approved time and invoices the buyers for the approved time. In conjunction therewith, the ICPR system can provide information to authorize lenders to finance invoices and monitor invoice activity of the suppliers associated with the orders in a financial network step 6100. Additionally flowing from the payroll and invoicing step 6090, the ICPR system can generate pay card activity, integrate the pay card activity with a financial institution and provide reports to the workers associated with the orders in a card network step 6150. Finally, the method concludes with an end step 6200. Consistent with the foregoing steps, the ICPR system provides reports about the orders throughout the method of operation thereof.

As mentioned above, the typical circumstance in the staffing industry is that each supplier uses an independent system of time capture (often paper time cards). Therefore, the typical buyer of staffing services from multiple suppliers does not enjoy a uniform approach to approving time or reviewing standard reports derived from time capture. The result is a very inefficient morass of different time collection methods and reporting approaches that render effective use and interpretation of staffing moot for buyers of staffing (see FIG. 1).

The ICPR system can integrate multiple time capture approaches, including a universal time clock, and custom tagging to clear the morass away, effectively linking together multitudes of buyer firms and supplier firms in a way that allows each to treat their staffing activity as being entirely customized, even while retaining the flexibility to work with any firm, anytime, anywhere. For years, procurement professionals have followed the principle that a company must shrink supplier count (ideally to one or possibly two) in order to reduce overhead and the cost of acquiring the procured items. That works for purchasing pencils or computers. However, because no staffing supplier has a truly complete geographic footprint, because staffing suppliers that do have larger geographic service areas are uneven in delivering quality across multiple locations, and because there are so many specializations by worker profile, the effective, high value procurement of workers via staffing suppliers will remain decentralized. The ICPR system provides a process by which that properly decentralized procurement process can centralize virtually every other process and reporting.

Also, although the present invention and its advantages have been described in detail, it should be understood that various changes, substitutions and alterations can be made herein without departing from the spirit and scope of the invention as defined by the appended claims. For example, many of the systems, subsystems and methodologies discussed above can be implemented in different methodologies and replaced by other related systems and subsystems, or a combination thereof, to advantageously form an ICPR system as described herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An information capture, processing and retrieval (ICPR) system shared by multiple buyers, multiple suppliers and multiple workers concurrently, comprising:
    a processing unit and memory configured to operate:
        an order documentation subsystem configured to document orders for said suppliers and said buyers with respect to said workers, each of said orders specifying a different method of time capture for said workers assigned thereto; and
        a time capture subsystem configured to receive said different methods of time capture associated with said workers positioned in one of anchored and untethered locations assigned to said orders including a buyer submit time capture associated with at least one of said workers.

2. The ICPR system as recited in claim 1 wherein said processing unit and memory are configured to operate a time approval and buyer tagging subsystem configured to allow said buyers to label time worked by said workers corresponding to said buyers with one or more tags, thereby translating approved time of said workers into custom, internal terminology of said buyers.

3. The ICPR system as recited in claim 1 wherein said order documentation subsystem is configured to allow said suppliers to label said orders associated with said time of said workers corresponding thereto with one or more tags, thereby translating said time of said workers into custom, internal terminology of said suppliers.

4. The ICPR system as recited in claim 1 wherein said methods of time capture are selected from the group consisting of:
    worker submit,
    buyer submit roster,
    time clock submit,
    buyer submit select, and
    supplier submit.

5. The ICPR system as recited in claim 1 wherein said methods of time capture associated with said workers positioned in anchored locations include time capture via a time clock that validates a physical presence at specific times of said workers, and said methods of time capture associated with said workers positioned in untethered locations include a time capture via a wired or wireless connected computer.

6. The ICPR system as recited in claim 1 wherein said processing unit and memory are configured to operate a reporting subsystem configured to provide reports about said orders.

7. The ICPR system as recited in claim 1 wherein said processing unit and memory are configured to operate a payroll and invoicing subsystem configured to provide payroll information about said workers and invoice said buyers for approved time.

8. The ICPR system as recited in claim 1 wherein said processing unit and memory are configured to operate a survey subsystem configured to capture, compile and process survey answers by said buyers regarding said orders.

9. The ICPR system as recited in claim 1 wherein said processing unit and memory are configured to operate a financial network subsystem configured to provide information to authorize lenders to finance invoices and monitor invoice activity of said suppliers associated with said orders.

10. The ICPR system as recited in claim 1 wherein said processing unit and memory are configured to operate a card network subsystem configured to generate pay card activity, integrate said pay card activity with a financial institution and provide reports to said workers associated with said orders.

11. A method of operating an information capture, processing and retrieval (ICPR) system operable on a processing unit shared by multiple buyers, multiple suppliers and multiple workers concurrently, comprising:
    documenting orders for said suppliers and said buyers with respect to said workers with said processing unit, each of said orders specifying a different method of time capture for said workers assigned thereto;
    receiving said different methods of time capture at said processing unit associated with said workers positioned in one of anchored and untethered locations assigned to said orders including a buyer submit time capture associated with at least one of said workers; and
    providing reports about said orders with said processing unit.

12. The method as recited in claim 11, further comprising:
    allowing said suppliers to label said orders associated with said time of said workers corresponding thereto with one or more tags, thereby translating said time of said workers into custom, internal terminology of said suppliers; and
    allowing said buyers to label time worked by said workers corresponding to said buyers with one or more tags, thereby translating approved time of said workers into custom, internal terminology of said buyers.

13. The method as recited in claim 11 wherein said methods of time capture are selected from the group consisting of:
    worker submit,
    buyer submit roster,
    time clock submit,
    buyer submit select, and
    supplier submit.

14. The method as recited in claim 11, further comprising:
    providing payroll information about said workers;
    invoicing said buyers for approved time; and
    capturing survey answers by said buyers regarding said orders.

15. The method as recited in claim 11, further comprising:
    providing information to authorize lenders to finance invoices;
    monitoring invoice activity of said suppliers associated with said orders;

generating pay card activity;
integrating said pay card activity with a financial institution; and
providing reports to said workers associated with said orders.

16. An information capture, processing and retrieval (ICPR) system shared by multiple buyers, multiple suppliers and multiple workers concurrently, comprising:
a processing unit and memory configured to operate:
a time capture subsystem configured to receive time worked by said workers of said suppliers; and
a time approval and buyer tagging subsystem configured to allow said buyers to label data associated with said time worked by said workers corresponding to said buyers with one or more tags, thereby translating data associated with approved time of said workers into custom, internal terminology of said buyers.

17. The ICPR system as recited in claim 16 wherein said processing unit and memory are configured to operate an order documentation subsystem configured to document orders for said suppliers and said buyers with respect to said workers.

18. The ICPR system as recited in claim 16 wherein said processing unit and memory are configured to operate an order documentation subsystem configured to allow said suppliers to label orders between said suppliers and said buyers associated with time of said workers corresponding thereto with one or more tags, thereby translating said time of said workers into custom, internal terminology of said suppliers.

19. The ICPR system as recited in claim 16 wherein said time capture subsystem is configured to receive different methods of time capture.

20. The ICPR system as recited in claim 19 wherein said methods of time capture are selected from the group consisting of:
worker submit,
buyer submit roster,
time clock submit,
buyer submit select, and
supplier submit.

21. The ICPR system as recited in claim 16 wherein said processing unit and memory are configured to operate a reporting subsystem configured to provide reports about orders between said suppliers and said buyers associated with said time worked by said workers.

22. The ICPR system as recited in claim 16 wherein said processing unit and memory are configured to operate a payroll and invoicing subsystem configured to provide payroll information about said workers and invoice said buyers for approved time.

23. The ICPR system as recited in claim 16 wherein said processing unit and memory are configured to operate a survey subsystem configured to capture, compile and process survey answers by said buyers about orders between said suppliers and said buyers associated with said time worked by said workers.

24. The ICPR system as recited in claim 16 wherein said processing unit and memory are configured to operate a financial network subsystem configured to provide information to authorize lenders to finance invoices and monitor invoice activity of said suppliers with orders between said suppliers and said buyers associated with said time worked by said workers.

25. The ICPR system as recited in claim 16 wherein said processing unit and memory are configured to operate a card network subsystem configured to generate pay card activity, integrate said pay card activity with a financial institution and provide reports associated with said time worked by said workers.

26. A method of operating an information capture, processing and retrieval (ICPR) system operable on a processing unit shared by multiple buyers, multiple suppliers and multiple workers concurrently, comprising:
receiving time worked by said workers of said suppliers at said processing unit;
allowing said buyers to label data associated with said time worked by said workers corresponding to said buyers with one or more tags with said processing unit, thereby translating data associated with approved time of said workers into custom, internal terminology of said buyers; and
providing reports about said orders with said processing unit.

27. The method as recited in claim 26 further comprising:
documenting orders for said suppliers and said buyers with respect to said workers; and
allowing said suppliers to label orders between said suppliers and said buyers associated with time of said workers corresponding thereto with one or more tags, thereby translating said time of said workers into custom, internal terminology of said suppliers.

28. The method as recited in claim 26 wherein said time capture subsystem is configured to receive different methods of time capture selected from the group consisting of:
worker submit,
buyer submit roster,
time clock submit,
buyer submit select, and
supplier submit.

29. The method as recited in claim 26, further comprising:
providing reports about orders between said suppliers and said buyers associated with said time worked by said workers;
providing payroll information about said workers;
invoicing said buyers for approved time; and
capturing survey answers by said buyers about orders between said suppliers and said buyers associated with said time worked by said workers.

30. The method as recited in claim 26, further comprising:
providing information to authorize lenders to finance invoices;
monitoring invoice activity of said suppliers with orders between said suppliers and said buyers associated with said time worked by said workers;
generating pay card activity;
integrating said pay card activity with a financial institution; and
providing reports associated with said time worked by said workers.

31. An information capture, processing and retrieval (ICPR) system shared by multiple buyers, multiple suppliers and multiple workers concurrently, comprising:
a processing unit and memory configured to operate:
an order documentation subsystem configured to document orders for said suppliers and said buyers with respect to said workers and allow said suppliers to label data of said orders associated with time of said workers corresponding thereto with one or more tags, thereby translating data associated with said time of said workers into custom, internal terminology of said suppliers.

32. The ICPR system as recited in claim 31 wherein said processing unit and memory are configured to operate a time capture subsystem configured to receive time worked by said workers of said suppliers.

33. The ICPR system as recited in claim 32 wherein said time capture subsystem is configured to receive different methods of time capture.

34. The ICPR system as recited in claim 33 wherein said methods of time capture are selected from the group consisting of:
worker submit,
buyer submit roster,
time clock submit,
buyer submit select, and
supplier submit.

35. The ICPR system as recited in claim 31 wherein said processing unit and memory are configured to operate a time approval and buyer tagging subsystem configured to allow said buyers to label time worked by said workers corresponding to said buyers with one or more tags, thereby translating approved time of said workers into custom, internal terminology of said buyers.

36. The ICPR system as recited in claim 31 wherein said processing unit and memory are configured to operate a reporting subsystem configured to provide reports about orders between said suppliers and said buyers associated with time worked by said workers.

37. The ICPR system as recited in claim 31 wherein said processing unit and memory are configured to operate a payroll and invoicing subsystem configured to provide payroll information about said workers and invoice said buyers for approved time.

38. The ICPR system as recited in claim 31 wherein said processing unit and memory are configured to operate a survey subsystem configured to capture, compile and process survey answers by said buyers associated with time worked by said workers.

39. The ICPR system as recited in claim 31 wherein said processing unit and memory are configured to operate a financial network subsystem configured to provide information to authorize lenders to finance invoices and monitor invoice activity of said suppliers with orders between said suppliers and said buyers associated with time worked by said workers.

40. The ICPR system as recited in claim 31 wherein said processing unit and memory are configured to operate a card network subsystem configured to generate pay card activity, integrate said pay card activity with a financial institution and provide reports associated with time worked by said workers.

41. A method of operating an information capture, processing and retrieval (ICPR) system operable on a processing unit shared by multiple buyers, multiple suppliers and multiple workers concurrently, comprising:
documenting orders for said suppliers and said buyers with respect to said workers with said processing unit;
allowing said suppliers to label data of said orders associated with time of said workers corresponding thereto with one or more tags with said processing unit, thereby translating data associated with said time of said workers into custom, internal terminology of said suppliers; and
providing reports about said orders with said processing unit.

42. The method as recited in claim 41 further comprising receiving time worked by said workers of said suppliers via different methods of time capture selected from the group consisting of:
worker submit,
buyer submit roster,
time clock submit,
buyer submit select, and
supplier submit.

43. The method as recited in claim 41 further comprising allowing said buyers to label time worked by said workers corresponding to said buyers with one or more tags, thereby translating approved time of said workers into custom, internal terminology of said buyers.

44. The method as recited in claim 41, further comprising:
providing reports about orders between said suppliers and said buyers associated with time worked by said workers;
providing payroll information about said workers;
invoicing said buyers for approved time; and
capturing survey answers by said buyers associated with said time worked by said workers.

45. The method as recited in claim 41, further comprising:
providing information to authorize lenders to finance invoices;
monitoring invoice activity of said suppliers with orders between said suppliers and said buyers associated with time worked by said workers;
generating pay card activity;
integrating said pay card activity with a financial institution; and
providing reports associated with said time worked by said workers.

* * * * *